US011655903B2

(12) United States Patent
Sloma et al.

(10) Patent No.: US 11,655,903 B2
(45) Date of Patent: *May 23, 2023

(54) CONTROL VALVE ASSEMBLY FOR FLUID TREATMENT APPARATUS

(71) Applicant: Culligan International Company, Rosemont, IL (US)

(72) Inventors: Adam Sloma, Arlington Heights, IL (US); Doug Anderson, St. Charles, IL (US); Harkirat Sahni, Huntley, IL (US); Lonnie Webb, Waterford, WI (US)

(73) Assignee: CULLIGAN INTERNATIONAL COMPANY, Rosemont, IL (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/999,457

(22) Filed: Aug. 21, 2020

(65) Prior Publication Data

US 2020/0386329 A1    Dec. 10, 2020

Related U.S. Application Data

(63) Continuation of application No. 15/905,038, filed on Feb. 26, 2018, now Pat. No. 10,767,770.

(Continued)

(51) Int. Cl.
*F16K 11/07* (2006.01)
*C02F 1/42* (2023.01)
(Continued)

(52) U.S. Cl.
CPC ............. *F16K 11/07* (2013.01); *C02F 1/008* (2013.01); *C02F 1/42* (2013.01); *F16K 31/04* (2013.01);
(Continued)

(58) Field of Classification Search
CPC ..... Y10T 137/86421; Y10T 137/86461; Y10T 137/86445; F16K 11/07; F16K 31/53;
(Continued)

(56) References Cited

U.S. PATENT DOCUMENTS 2,704,677 A ‡ 3/1955 Quest ...................... F16L 31/00
285/5
3,049,239 A ‡ 8/1962 Rudelick .................. C02F 1/42
210/275
(Continued)

FOREIGN PATENT DOCUMENTS

CA           103404 A   ‡  5/1907
CA           2038358    ‡  9/1991
(Continued)

OTHER PUBLICATIONS

European Search Report for corresponding European patent application No. EP 18158973, dated May 30, 2018.‡

*Primary Examiner* — Matthew W Jellett
(74) *Attorney, Agent, or Firm* — Greer, Burns & Crain, Ltd

(57) ABSTRACT

A control valve assembly is provided for a fluid treatment system, including a housing having a top portion and a bottom portion secured to the top portion, the housing including an inlet and an outlet. At least two modular chambers are secured in the housing. A first chamber is configured to receive fluid from the inlet and a second chamber is configured to provide fluid to the outlet. A piston is also provided which includes a shaft with a plurality of sealing rings. The piston extends through the housing and (Continued)

through the first chamber and the second chamber. The piston is configured to reciprocate in an axial direction to control the flow of fluid in the control valve assembly.

6 Claims, 23 Drawing Sheets

Related U.S. Application Data

(60) Provisional application No. 62/464,962, filed on Feb. 28, 2017.

(51) Int. Cl.
  *F16K 31/524* (2006.01)
  *F16K 37/00* (2006.01)
  *F16K 31/53* (2006.01)
  *F16K 31/04* (2006.01)
  *C02F 1/00* (2023.01)

(52) U.S. Cl.
  CPC ...... *F16K 31/524* (2013.01); *F16K 31/52475* (2013.01); *F16K 31/52483* (2013.01); *F16K 31/53* (2013.01); *F16K 37/0041* (2013.01); *C02F 2201/005* (2013.01); *C02F 2209/40* (2013.01)

(58) Field of Classification Search
  CPC ...... F16K 31/54; F16K 31/508; F16K 31/524; F16K 31/52475; F16K 31/52483; F16K 31/04; F16K 37/0041; C02F 1/008; C02F 1/42; C02F 2209/40; C02F 2201/005
  See application file for complete search history.

(56) References Cited

U.S. PATENT DOCUMENTS

| | | | | |
|---|---|---|---|---|
| 3,237,640 A ‡ | 3/1966 | Whitlock et al. | ......... | C02F 1/42 137/399 |
| 3,381,823 A ‡ | 5/1968 | Nash | ................. | B01D 24/4642 210/27 |
| 3,488,824 A ‡ | 1/1970 | Boteler | ................... | F16K 7/126 29/890 |
| 3,680,596 A ‡ | 8/1972 | Pickett | ................. | F16J 15/3204 137/625.69 |
| 4,290,451 A ‡ | 9/1981 | Fleckenstein | ............. | C02F 1/42 137/59 |
| 5,089,140 A ‡ | 2/1992 | Brane | ........................ | C02F 1/42 210/14 |
| 5,116,491 A ‡ | 5/1992 | Brane | ........................ | C02F 1/42 210/14 |
| 5,122,274 A ‡ | 6/1992 | Heskett | ................... | C02F 1/705 210/63 |
| 5,135,654 A ‡ | 8/1992 | Heskett | ................... | C02F 1/705 210/63 |
| 5,157,979 A ‡ | 10/1992 | Brane | ........................ | C02F 1/42 74/567 |
| D331,097 S ‡ | 11/1992 | Sieren | ........................ | D23/20 |
| 5,162,080 A ‡ | 11/1992 | Drager | ..................... | C02F 1/42 137/62 |
| D332,480 S ‡ | 1/1993 | Sieren | ........................ | D23/20 |
| 5,198,118 A ‡ | 3/1993 | Heskett | ................... | C02F 1/705 210/63 |
| 5,269,932 A ‡ | 12/1993 | Heskett | ................... | C02F 1/705 210/63 |
| 5,275,737 A ‡ | 1/1994 | Heskett | ................... | C02F 1/705 210/63 |
| 5,300,230 A ‡ | 4/1994 | Brane | ........................ | C02F 1/42 210/14 |
| 5,314,623 A ‡ | 5/1994 | Heskett | ................... | C02F 1/281 210/63 |
| 5,358,635 A ‡ | 10/1994 | Frank | ..................... | B01D 61/08 210/90 |
| 5,378,370 A ‡ | 1/1995 | Brane | ....................... | C02F 1/42 210/26 |
| 5,415,770 A ‡ | 5/1995 | Heskett | .................... | C02F 1/705 210/20 |
| 5,433,856 A ‡ | 7/1995 | Heskett | ................... | C02F 1/281 210/63 |
| 5,510,034 A ‡ | 4/1996 | Heskett | ................... | C02F 1/281 210/63 |
| 5,584,411 A ‡ | 12/1996 | Channell | ............. | B67D 7/0288 220/59 |
| 5,599,454 A ‡ | 2/1997 | Heskett | ................... | C02F 1/281 210/63 |
| 5,699,930 A ‡ | 12/1997 | Channell | ............. | B67D 7/0288 220/59 |
| 5,833,859 A ‡ | 11/1998 | Heskett | ................... | C02F 1/281 210/63 |
| 5,837,134 A ‡ | 11/1998 | Heskett | ..................... | C02F 1/48 210/17 |
| 5,890,750 A ‡ | 4/1999 | Channell | ............. | C02F 1/325 285/32 |
| 5,910,244 A * | 6/1999 | Stamos | ..................... | C02F 1/42 210/138 |
| 5,951,869 A ‡ | 9/1999 | Heskett | ................... | C02F 1/281 210/63 |
| 6,090,285 A ‡ | 7/2000 | Chau | ..................... | B01D 24/008 210/28 |
| 6,176,258 B1 * | 1/2001 | Bernardi | ........... | F16K 31/52483 137/554 |
| 6,197,204 B1 ‡ | 3/2001 | Heskett | ................... | C02F 1/281 210/74 |
| 6,402,944 B1 ‡ | 6/2002 | Vaughan | .................. | C02F 1/42 137/597 |
| 6,444,127 B1 ‡ | 9/2002 | Vaughan | ............... | F16K 31/046 137/554 |
| 6,583,422 B2 ‡ | 6/2003 | Boehme | ................. | C02F 1/325 250/43 |
| 6,627,070 B1 ‡ | 9/2003 | Frank | ........................ | C02F 1/74 210/12 |
| D482,754 S ‡ | 11/2003 | Rhinehart | ...................... | D23/20 |
| D482,755 S ‡ | 11/2003 | Rhinehart | ...................... | D23/20 |
| 6,644,349 B2 ‡ | 11/2003 | Scanlan | ................... | F16K 11/07 137/625.48 |
| 7,008,530 B2 ‡ | 3/2006 | Stocchiero | ................ | C02F 1/42 210/143 |
| 7,815,796 B2 ‡ | 10/2010 | Nibler | ..................... | B01D 35/30 210/16 |
| 7,980,270 B2 ‡ | 7/2011 | Bertsch | ................. | F04B 43/026 137/625.68 |
| 8,275,229 B2 ‡ | 9/2012 | Shimirak | ............. | H02G 15/013 385/13 |
| 8,302,631 B2 | 11/2012 | Quinn et al. | | |
| 8,318,010 B2 ‡ | 11/2012 | Yukon | ................ | G01N 30/6021 210/19 |
| 8,328,162 B2 ‡ | 12/2012 | Prescott | ................... | C02F 1/42 251/28 |
| 8,496,025 B2 ‡ | 7/2013 | Parsons | ................. | F16K 31/402 137/62 |
| 8,925,969 B2 ‡ | 1/2015 | Sonnier | ................. | F16L 23/003 285/88 |
| 9,194,493 B2 ‡ | 11/2015 | Richiuso | ...................... | F16B 2/18 |
| 9,452,942 B2 ‡ | 9/2016 | Kovach | ..................... | B01J 49/75 |
| 9,523,444 B2 ‡ | 12/2016 | Shishido | ............. | F16K 37/0016 |
| 9,625,041 B1 ‡ | 4/2017 | Lopez | ..................... | F16K 11/06 |
| 9,758,387 B2 ‡ | 9/2017 | Gruett | ....................... | C02F 1/42 |
| 9,783,433 B2 ‡ | 10/2017 | Downs | ..................... | C02F 1/42 |
| 2004/0020833 A1‡ | 2/2004 | Frank | ..................... | C02F 1/74 210/12 |
| 2007/0170110 A1‡ | 7/2007 | Onoue | ................... | B01D 35/30 210/44 |
| 2008/0164436 A1‡ | 7/2008 | Hughes | ................. | F16K 41/12 251/21 |
| 2008/0196771 A1‡ | 8/2008 | Hughes | ................. | F16K 15/18 137/39 |

(56) References Cited

U.S. PATENT DOCUMENTS

| | | | |
|---|---|---|---|
| 2008/0264851 A1 ‡ | 10/2008 | Emerson | B01J 47/022 |
| | | | 210/26 |
| 2015/0090663 A1 | 4/2015 | Gruett et al. | |
| 2015/0192210 A1 ‡ | 7/2015 | Averbeck | F16K 11/0716 |
| | | | 137/62 |
| 2016/0238143 A1 ‡ | 8/2016 | Lopez | F16K 31/5286 |
| 2017/0114903 A1 | 4/2017 | Boglio et al. | |

FOREIGN PATENT DOCUMENTS

| | | | | |
|---|---|---|---|---|
| CN | 201513623 U | | 6/2010 | |
| CN | 205877281 U | | 1/2017 | |
| DE | 69101245 | ‡ | 6/1994 | |
| DE | 102010061179 A1 | ‡ | 6/2012 | C02F 1/42 |
| DE | 102010061179 A1 | | 6/2012 | |
| EP | 0447350 B1 | ‡ | 3/1991 | |
| KR | 10-0997939 | ‡ | 11/2010 | |
| WO | 2014058724 A1 | | 4/2014 | |
| WO | WO-2014058724 A1 | ‡ | 4/2014 | B01D 61/10 |

\* cited by examiner
‡ imported from a related application

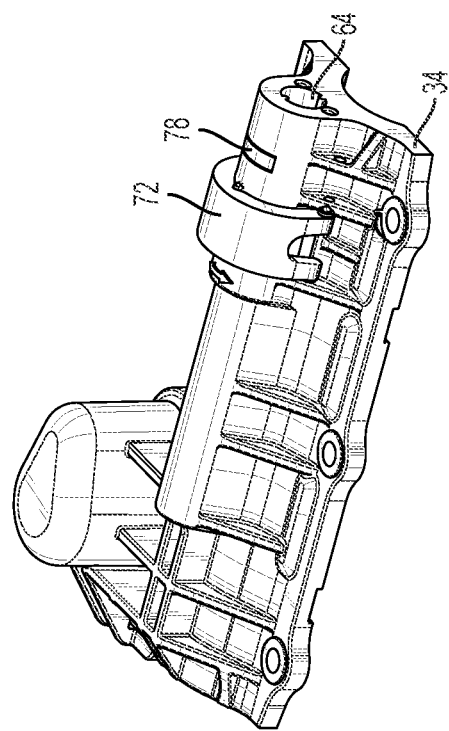
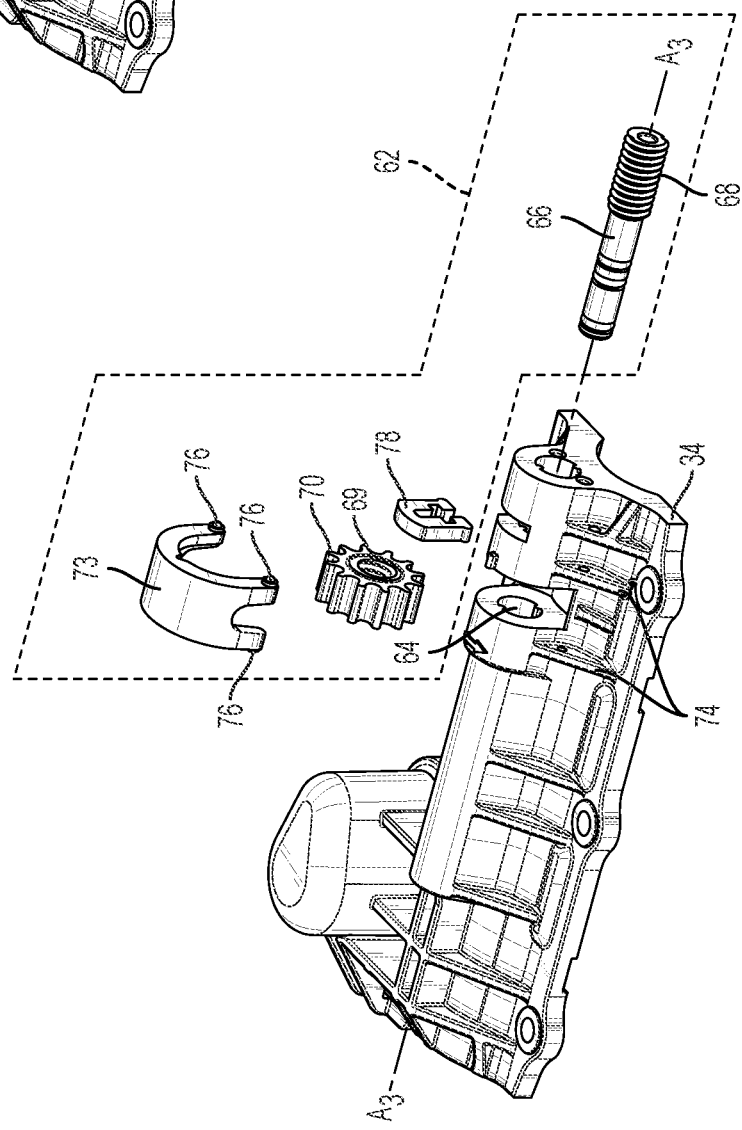

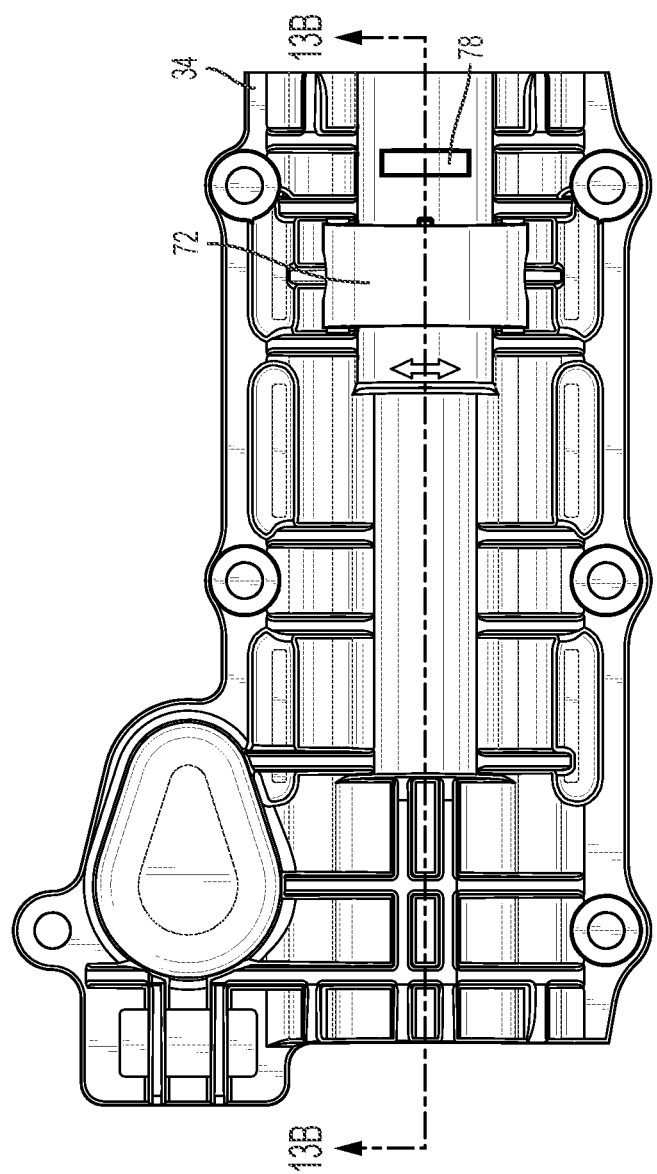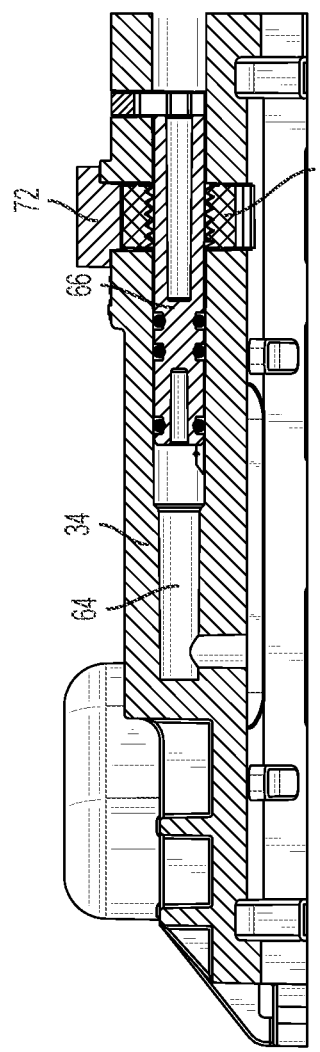

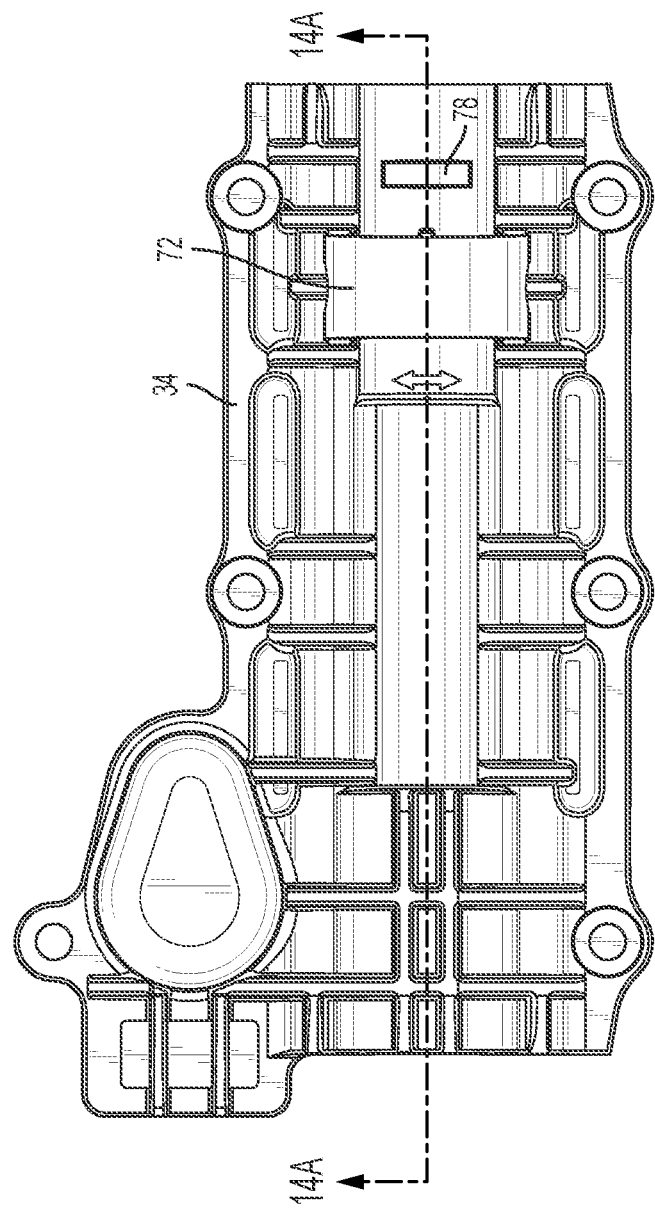
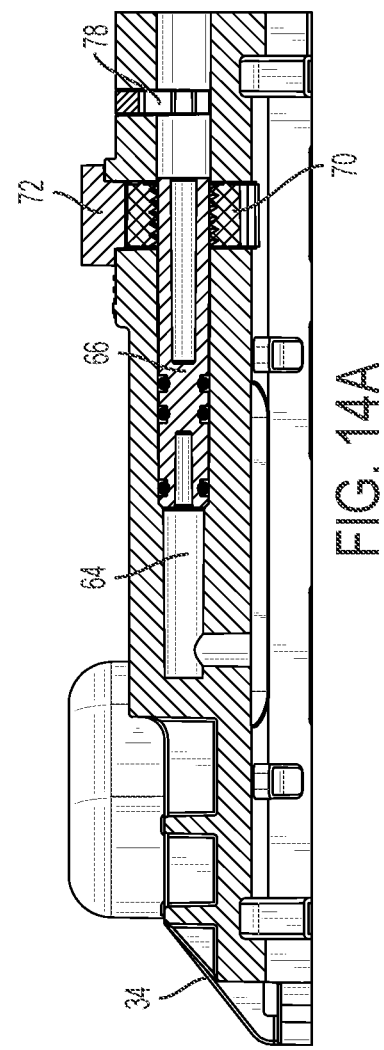
FIG. 14
FIG. 14A

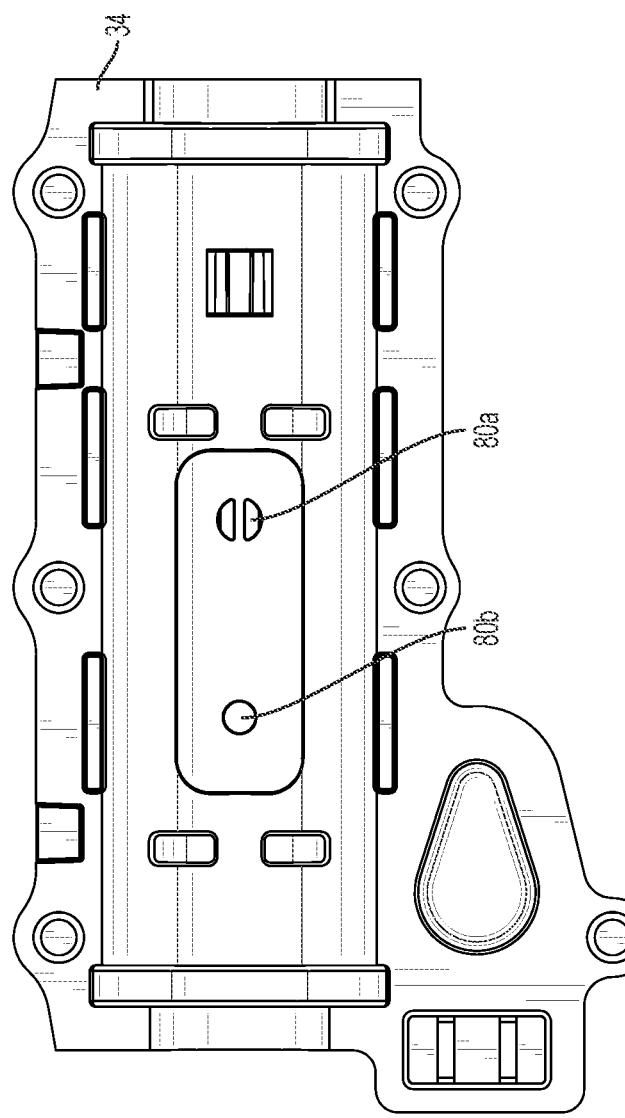

CONTROL VALVE ASSEMBLY FOR FLUID TREATMENT APPARATUS

RELATED APPLICATIONS

This application is a continuation of U.S. patent application Ser. No. 15/905,038 filed on Feb. 26, 2018 which claims priority to U.S. Provisional Patent Application No. 62/464,962, filed on Feb. 28, 2017, the entireties of both of which are incorporated herein by reference.

BACKGROUND

The present invention relates generally to fluid treatment systems such as water treatment systems including water softeners, and more particularly to a control valve for a water softening system. It is recognized that many aspects of the present invention can be applied to other types of fluid treatment systems, such as filtering or de-ionizing systems.

Control valve assemblies for fluid treatment systems, such as water softeners, often use pistons equipped with radial ring seals to control the flow of fluids though the control valve assemblies. Such controls are used to periodically seal off certain flow paths and open others, under the control of a timer portion of the control valve. As is known in the art, such water softeners cycle between service, backwash, brine rinse, slow rinse, fast rinse, brine refill, and other operations well known to designers of such equipment. Operation of such valves is described in U.S. Pat. Nos. 8,302,631, 6,644,349, and 6,176,258, all of which are incorporated herein by reference.

There is a continuing need and desire for an improved control valve assembly for a fluid treatment apparatus which is easier to manufacture, assemble, install, and service.

SUMMARY

The above-identified need is met by the present control valve assembly, which is particularly suited for use in water softeners. Features included on the present control valve include a two-part housing secured together with fasteners that provide for a construction that is easier to assemble for installation and disassemble for maintenance and repair. Additionally, unlike some conventional which have machined parts and/or require tools for installation, such a design utilizes molded components which are less expensive, easier to replace, and require only minimal tools for assembly.

Another feature is that a blending valve is integrally formed in the housing. Such a blending valve allows for a quicker and easier installation since it eliminates the requirement for a complex, enteral blending valve to be coupled to the control valve assembly.

Yet another feature is that a single piston extends through the housing. The cylinder for the piston is formed by a plurality of modular chambers. Such a construction allows for only one piston to be used, reducing the number of moving parts. Additionally, the modular chambers provide for an easier assembly, installation, and maintenance of the control valve assembly. The modular chambers allow for molded components to be utilized.

Still another feature is that a modular drain assembly is secured to the housing. Such a feature allows again for a control valve assembly that is easier to assemble, easier to separate for maintenance, and does not require complex parts. Additionally, maintenance and repair is made easier with modular components.

A further feature is a flow meter located within the valve body. Such a design utilizes molded components which are less expensive than conventional flow meters which typically have machined components.

Another feature is a cavity for an eductor of a brine valve assembly being integrally formed in the housing. A removable cap is utilized to allow for access to the eductor. Such a configuration provides for a control valve assembly that is easier to assemble and separate for maintenance.

Finally, an additional feature is that the brine valve assembly is associated with a drive cam that is rotated by a motor. The rotation of the motor can move a brine piston to control fluid flow. The position of the drive cam will control the opening or closing of the brine valve based upon the position of the brine piston. In the present valve, the brine piston cam is integral with the main piston cam assembly which includes an electro-optical sensor.

More specifically, a control valve assembly is provided for a fluid treatment system, including a housing having a top portion and a bottom portion secured to the top portion, the housing including an inlet and an outlet. At least two modular chambers are secured in the housing. A first chamber is configured to receive fluid from the inlet and a second chamber is configured to provide fluid to the outlet. A piston is also provided which includes a shaft with a plurality of sealing rings. The piston extends through the housing and through the first chamber and the second chamber. The piston is configured to reciprocate in an axial direction to control the flow of fluid in the control valve assembly.

In another embodiment, a control valve assembly is provided for a fluid treatment system, including a housing having a top portion and a bottom portion secured to the top portion, the housing including an inlet and an outlet. At least two chambers are secured in the housing. A first chamber is configured to receive fluid from the inlet and a second chamber is configured to provide fluid to the outlet. A piston, including a shaft with a plurality of sealing rings, extends through the housing and through the first chamber and the second chamber. The piston is configured to reciprocate in an axial direction to control the flow of fluid in the control valve assembly. A blending valve including a channel integrally formed with the top portion of the housing is also provided.

In still another embodiment, a control valve assembly is provided for a fluid treatment system, including, a housing having a top portion and a bottom portion secured to the top portion and forming a cavity having a first end and a second end and defining an axis extending between the first end and the second end. The housing further includes an inlet and an outlet. At least two chambers are disposed in the housing. A first chamber is in fluid communication with the inlet and a second chamber is in fluid communication with the outlet. A piston extends through the at least two chambers in the housing and is configured to reciprocate along a longitudinal axis to control the flow of fluid in the control valve assembly through the first chamber and the second chamber. A brine valve assembly, including a brine piston configured to selectively open and close the brine valve assembly, is provided. A main piston drive cam is provided and configured to move the piston. A brine cam is integrally joined to the drive cam. Additional features, aspects, embodiments, and details of the invention, all of which may be combinable in any manner, are set forth in the following detailed description.

BRIEF DESCRIPTION OF THE DRAWINGS

FIG. 11 is a rear and top perspective view of a blending valve and the top portion of the housing shown in FIG. 10;

FIG. 12 is a top perspective assembled view of the assembly of FIG. 11;

FIG. 13A is a top view of the top portion of the housing of the present control valve assembly;

FIG. 13B is a cross-section taken along the line B-B of FIG. 13A and in the direction indicated;

FIG. 14 is a top view of the top portion of the housing of the present control valve assembly;

FIG. 14A is a cross-section taken along the line A-A of FIG. 14 and in the direction indicated;

FIG. 14B is a bottom view of the top portion of the housing of FIG. 14;

DETAILED DESCRIPTION

Figure 2:
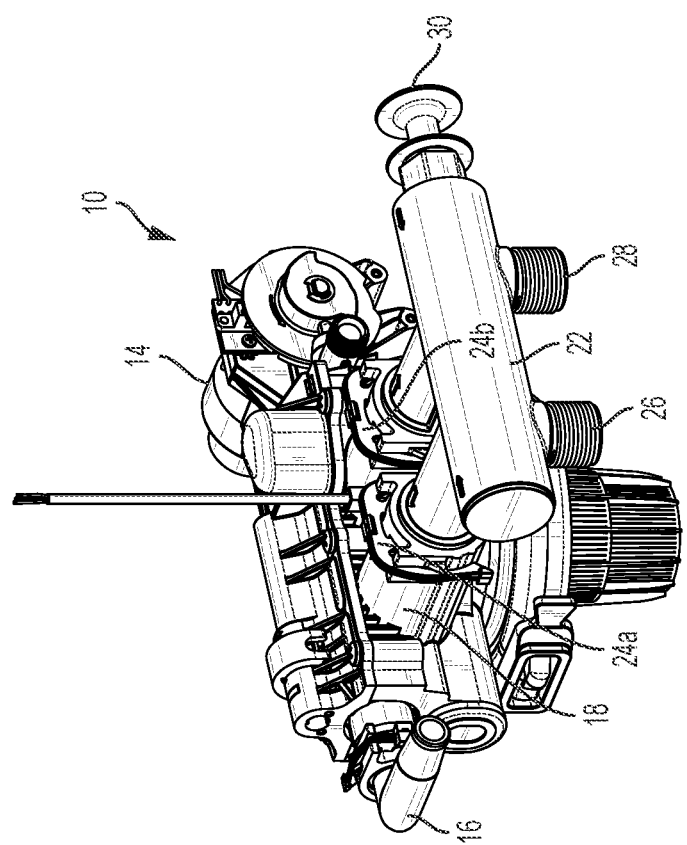
FIG. 2 is a top and side perspective view of the control valve shown in FIG. 1.
Figure 1:
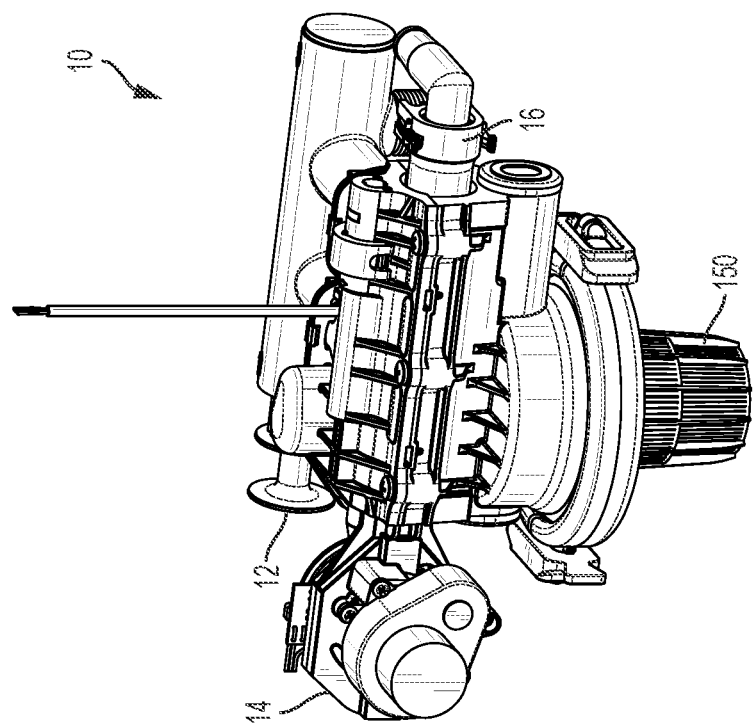
FIG. 1 is a top and front perspective view of the present control valve.
Figure 4:
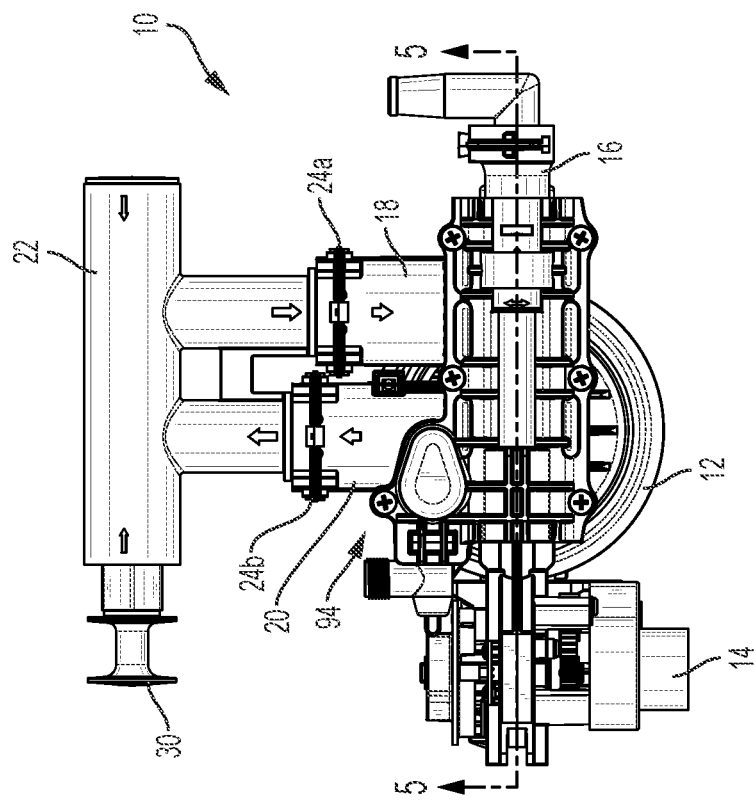
FIG. 4 is a top view of the control valve shown in FIG. 1.
Figure 3:
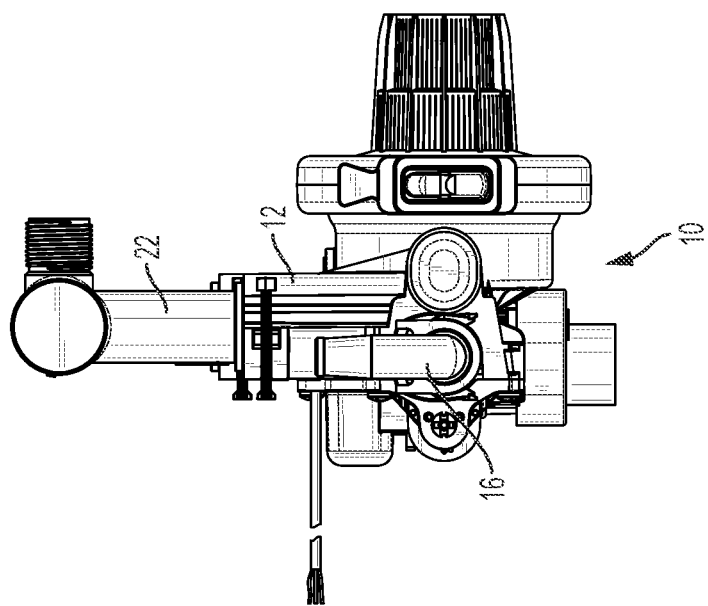
FIG. 3 is a drain end view of the control valve shown in FIG. 1.
Figure 5:
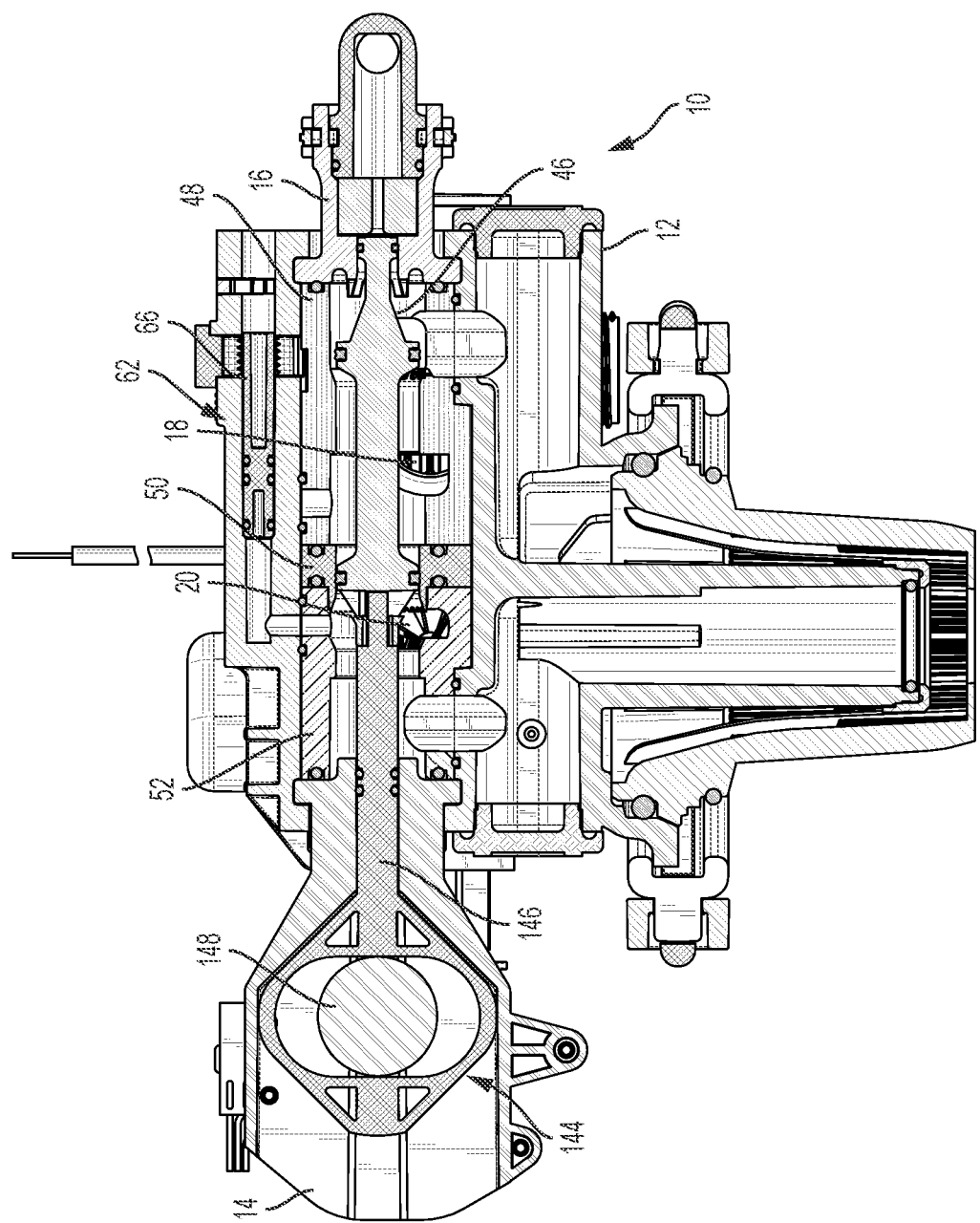
FIG. 5 is a vertical cross-section of the control valve shown in FIG. 1.
Figure 7:
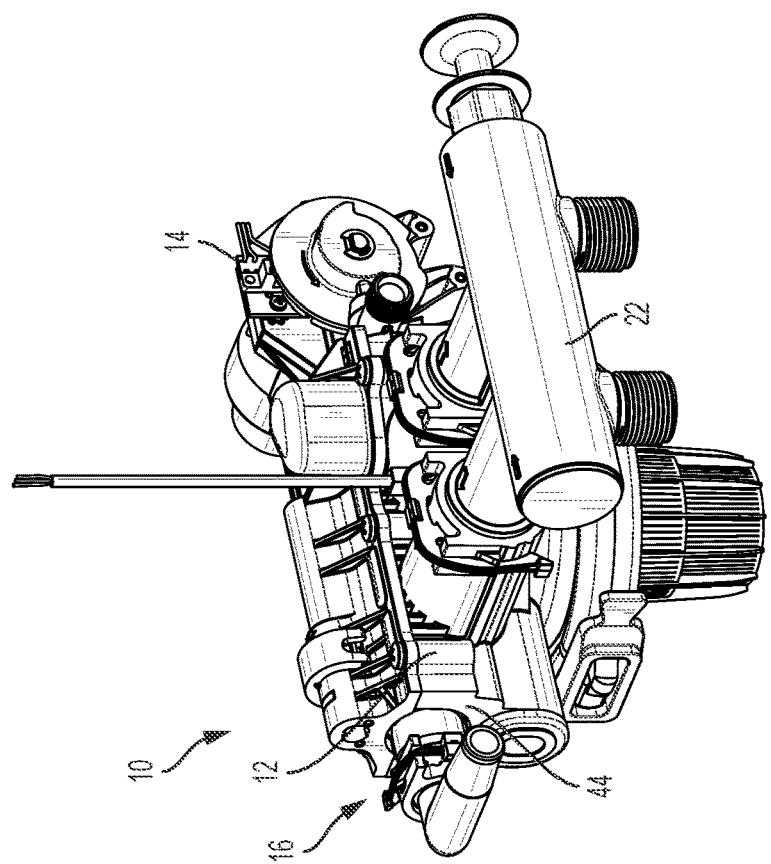
FIG. 7 is another side perspective view of the control valve shown in FIG. 1.
Figure 6:
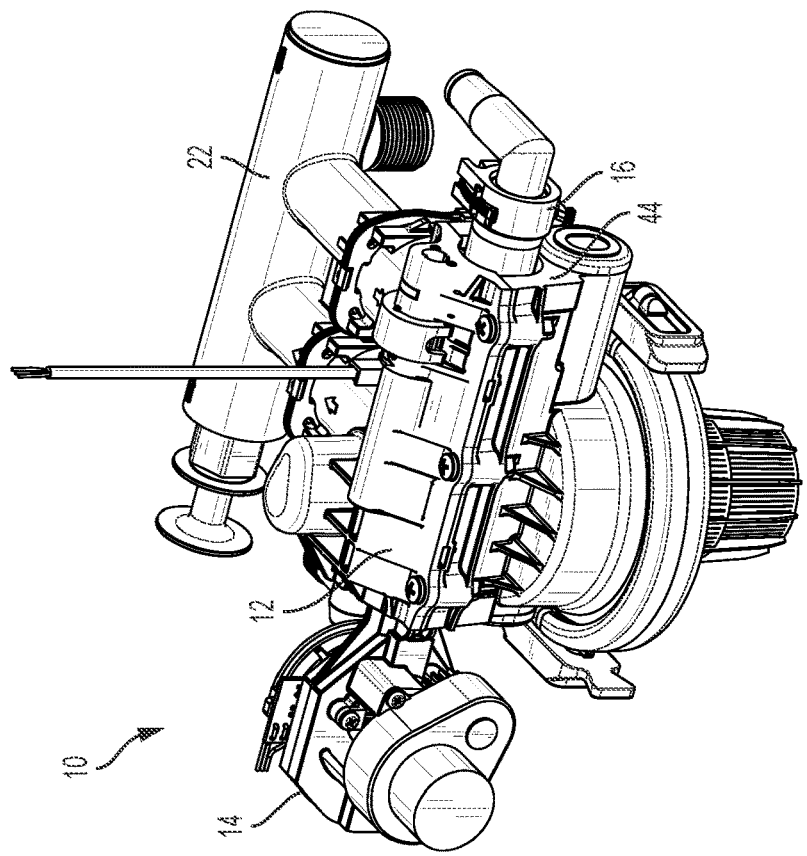
FIG. 6 is another top perspective view of the control valve shown in FIG. 1.

Referring now to FIGS. 1 to 8, a control valve assembly for a fluid treatment system is generally designated 10. Preferably, the fluid treatment system used with the control valve assembly 10 is a water softening system, which includes a resin tank and a brine tank (both not shown but are well known in the art); however, other fluid treatment systems are contemplated to be used with the present control valve assembly 10. Also in the present discussion, "fluid" is intended to mean any type of flowing liquid, but preferably refers to water.

The control valve assembly 10 includes a housing 12, a motor assembly 14, and a drain port assembly 16. The housing also includes an inlet 18 configured to receive untreated fluid and an outlet 20 configured to pass treated fluid out of the control valve assembly 10.

A bypass valve 22 is releasably attached to the housing 12 via two clips 24a, 24b. Preferably, one clip 24a is associated with the inlet 18 and the second clip 24b is associated with the outlet 20. A preferred design for the clips 24a, 24b is disclosed in detail in U.S. application Ser. No. 15/282,452 filed on Sep. 30, 2016 (U.S. Pat. Pub. No. 2017/0114903), the entirety of which is incorporated herein by reference.

As is known in the art, the bypass valve 22 includes an inlet 26 and an outlet 28. The inlet 26 is typically connected to a source of fluid, for example raw or standard tap water. The outlet 28 is secured to, for example, plumbing or piping to provide fluids downstream of the fluid treatment system. Also included in the bypass valve 22 is an actuating mechanism 30 such as a manually operated plunger to selectively control whether fluids flow through the fluid treatment system or bypass same when treatment is not desired. Such bypass valves 22 are known in the art.

Figure 8:
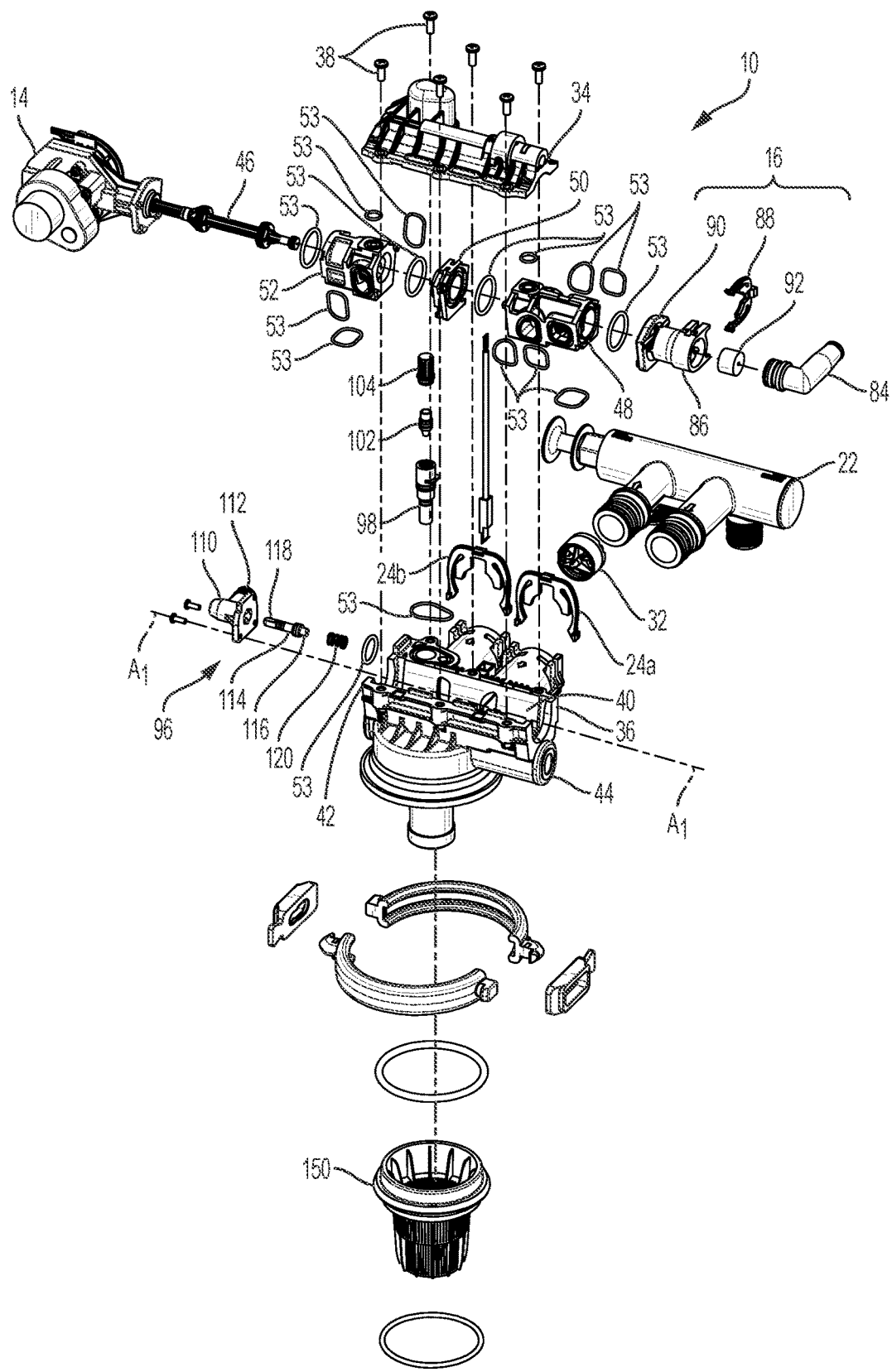
FIG. 8 is an exploded perspective view of the present control valve assembly.

Referring now to FIG. 8, the control valve assembly 10 also includes a flow meter 32. The flow meter 32 is preferably disposed directly in the outlet 20 of the control valve assembly 10. While other configurations are contemplated, a feature of the present control valve assembly is that the flow meter 32 is not required to be in a specialized portion of the housing 12 but is instead located in the existing outlet 20.

In addition, the housing 12 of the control valve assembly 10 includes a top portion 34 and a bottom portion 36. Upon assembly, the top portion 34 and the bottom portion 36 are secured in a sealing engagement via, for example, threaded fasteners 38. The housing 12, and more specifically, the top portion 34 and the bottom portion 36, defines a cavity 40 that includes an axis $A_1$ (FIG. 8) extending from one end 42 of the housing 12 to a second end 44. In the depicted embodiment, the motor assembly 14 is secured to the housing 12 at the first end 42 and the drain port assembly 16 is secured to the housing 12 at the second end 44. Other configurations are contemplated.

Figure 9:
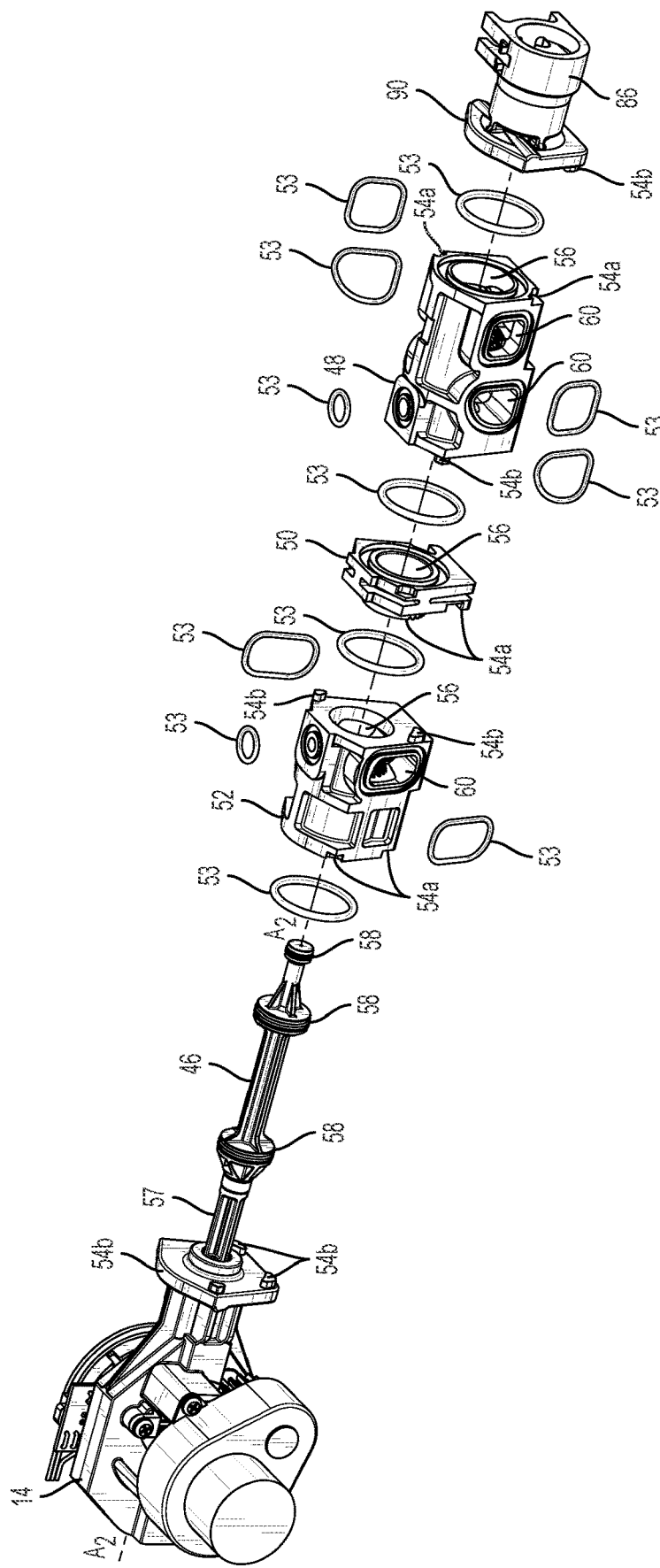
FIG. 9 is a fragmentary exploded perspective view of the motor piston and modular chambers of the present control valve assembly.
Figure 10:
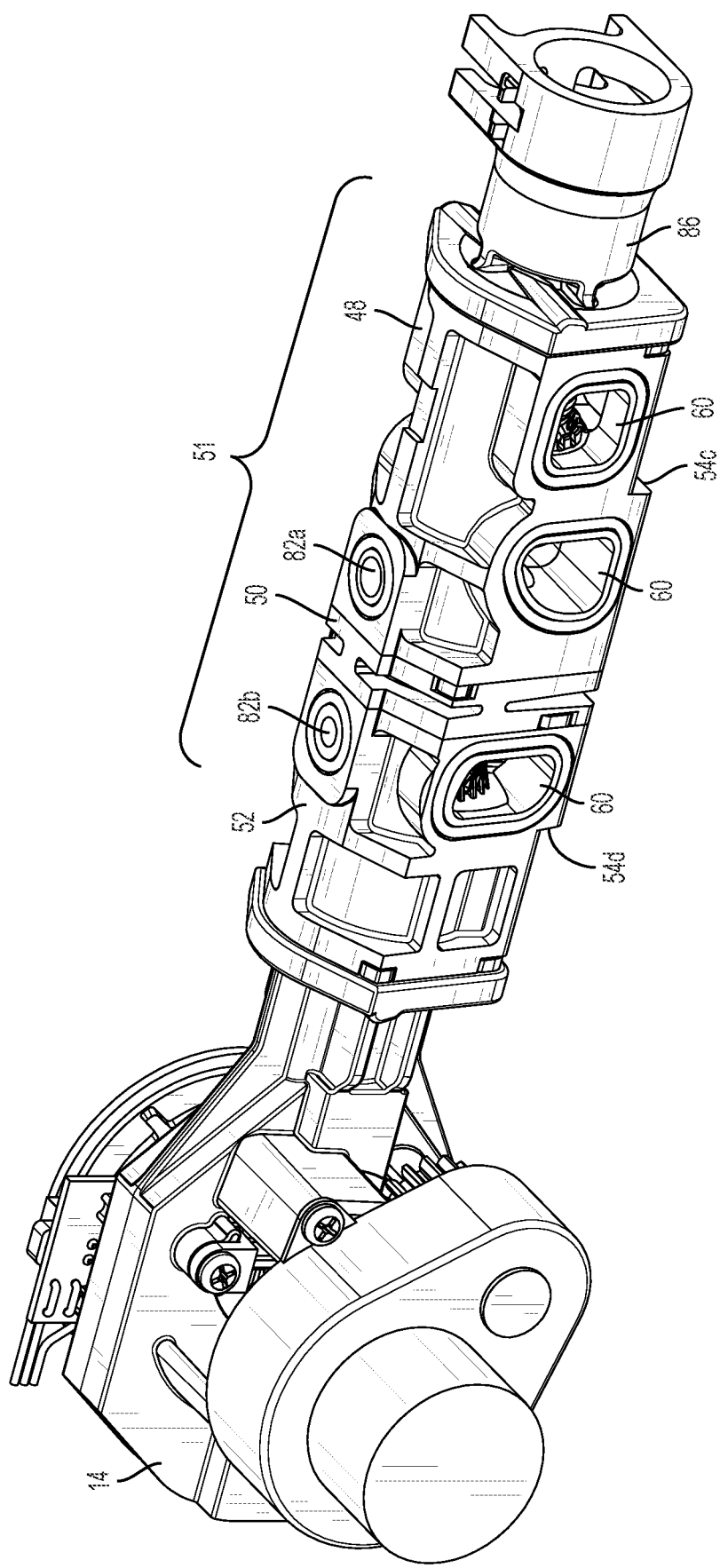
FIG. 10 is perspective assembled view of the assembly of FIG. 9.
Figure 15:
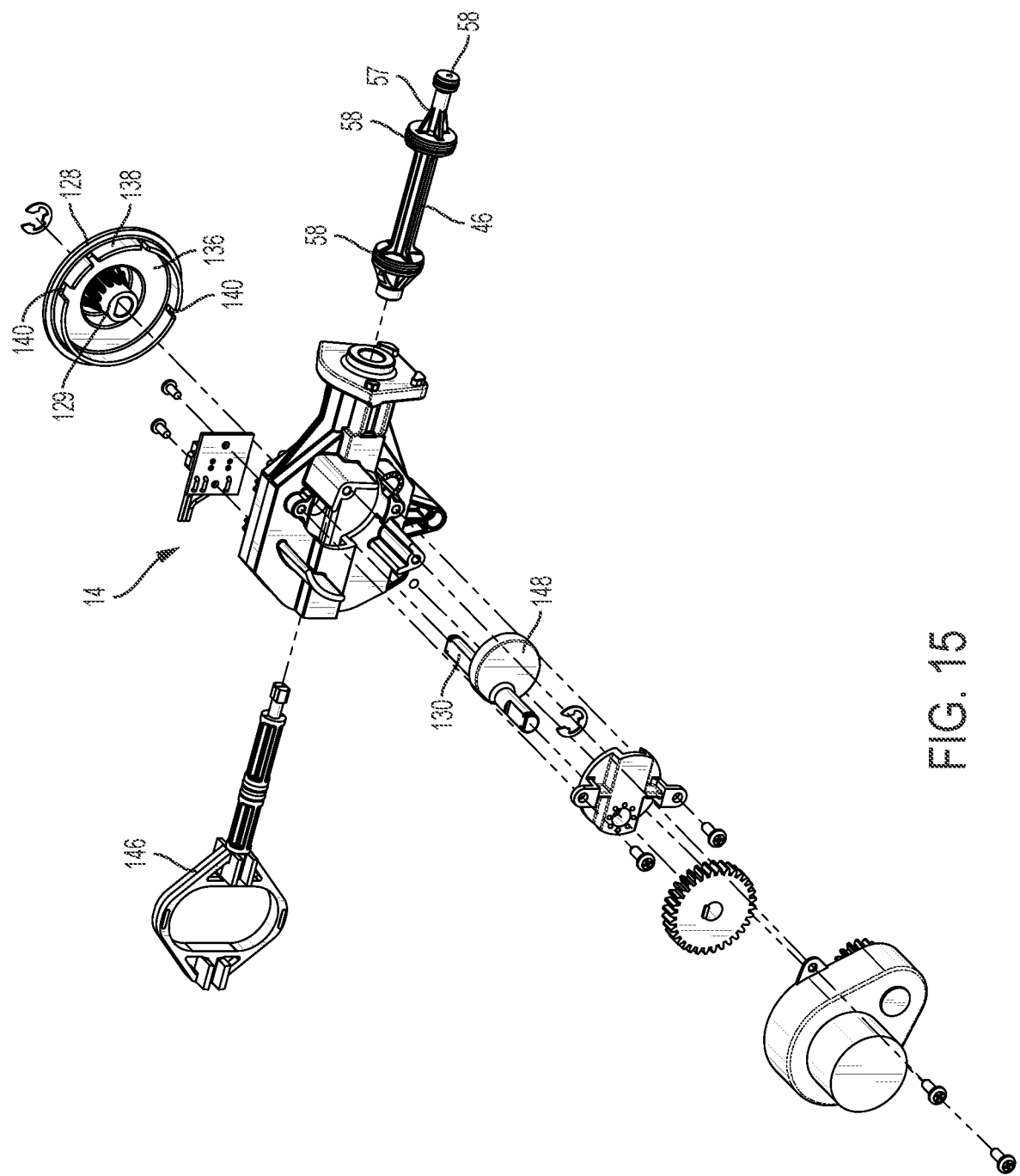
FIG. 15 is an exploded view of the present motor and piston drive assembly.
Figure 16:
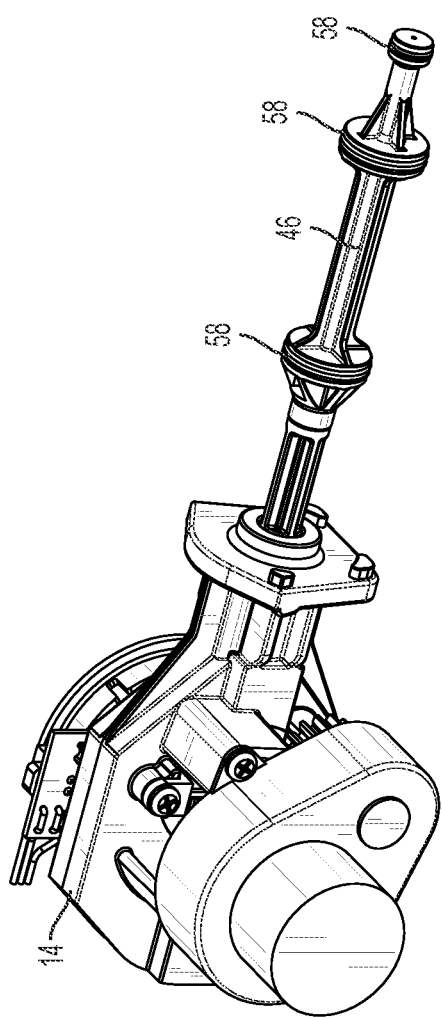
FIG. 16 is a perspective assembled view of the assembly of FIG. 15.
Figure 17:
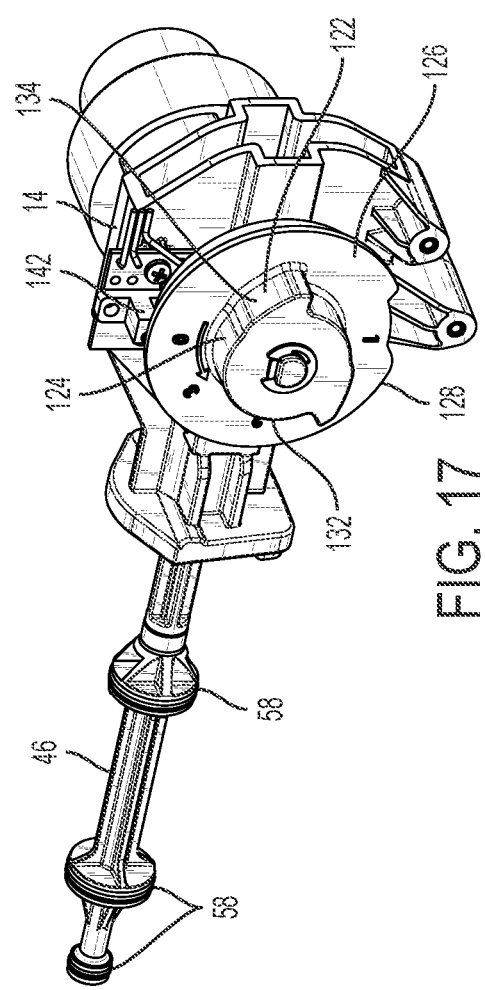
FIG. 17 is a reverse side perspective assembled view of the assembly of FIG. 15.
Figure 18:
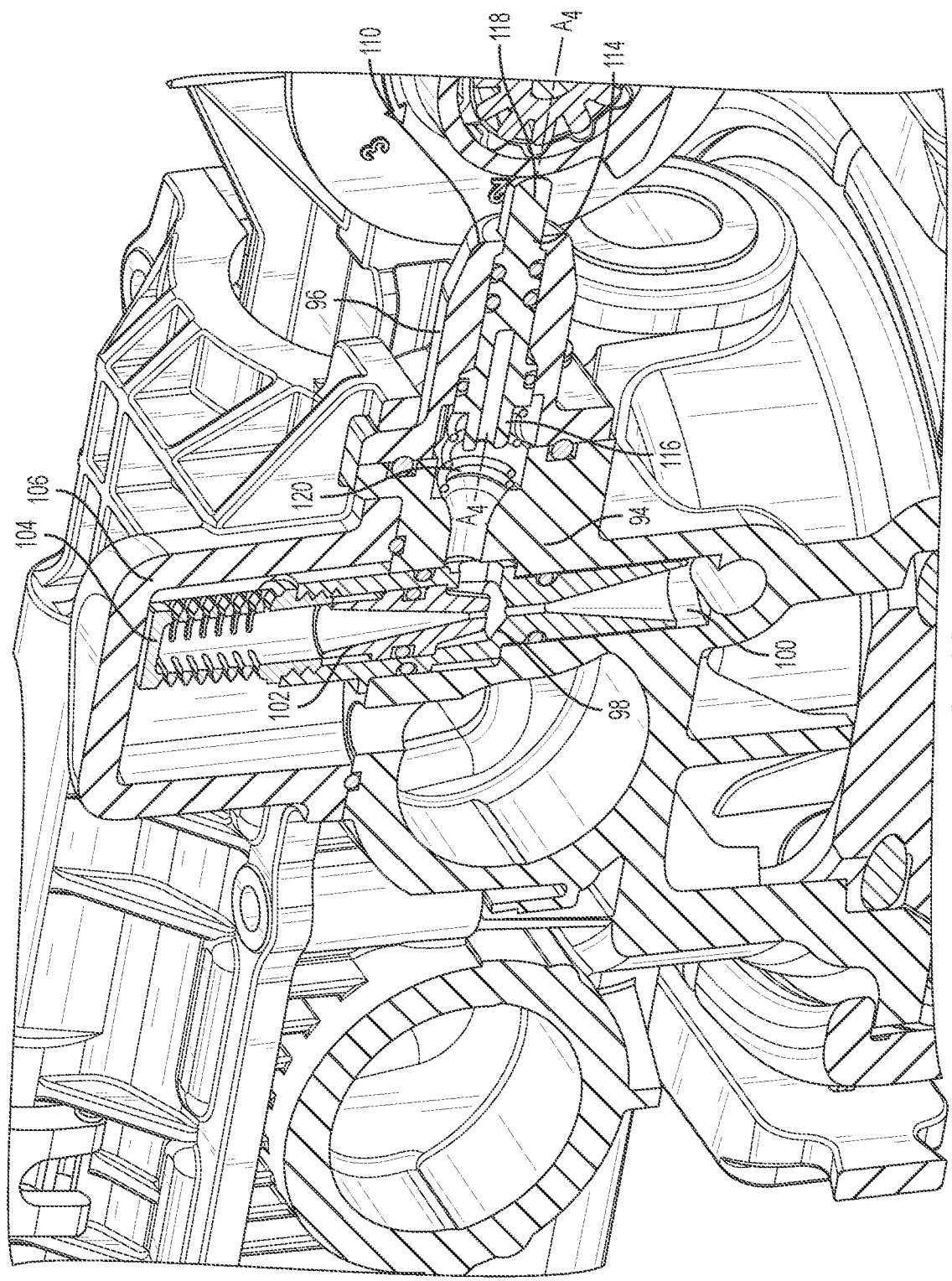
FIG. 18 is a cutaway view of the brine valve assembly and the eductor assembly.

Referring now to FIGS. 8-10, a piston 46 extends through the housing 12. As will be discussed in more detail below, the piston 46 is configured to reciprocate in a direction parallel with or along the axis $A_1$ of the cavity 40 to provide various fluid flow paths through the control valve assembly 10.

Disposed in the housing 12, preferably in the cavity 40, are a plurality of modular chambers 48, 50, 52. The various chambers are configured to receive and direct fluid, as will be discussed in more detail below. In the depicted embodiment, there are three modular chambers 48, 50, 52. While any number of modular chambers are contemplated, preferably there are at least two chambers.

Referring now to FIGS. 5, 8, 9 and 10, when assembled, as discussed below, the modular chambers 48, 50, 52 form a cylinder 51 with axial apertures 56 (discussed below) for the piston 46. As shown in FIGS. 9 and 10, O-rings 53, or other similar gaskets or seals, are used between the chambers 48, 50, 52, as well as between other components of the control valve assembly 10 to provide for a sealing engagement as is known in the art. It should be noted that the O-rings 53 are each located in an associated groove in the respective modular chamber 48, 50, 52 so that when the chambers are removed from the housing 12, which is easily accomplished without the use of tools once the housing is opened, the O-rings 53 are replaced along with the respective chamber.

The modular chambers 48, 50, 52 engage slots 54a and pins 54b located on adjacent chambers to form the cylinder 51. The modular chambers 48, 50, 52 also engage with the pins 54b on the motor assembly 14 and pins 54b on the drain port assembly 16 (specifically a drain port module 86 discussed below) to form a sub-assembly. Once the sub-assembly is formed, it is inserted into the housing 12 and in the housing 12, the chambers 48, 50, 52 include engagement portions 54c, 54d configured to engage one of the top and bottom housing portions 34, 36.

The modular chambers 48, 50, 52 include axial apertures 56 arranged along the axis $A_1$ of the cavity 40. These apertures 56 are configured to be selectively sealed by sealing rings 58 such as O-rings, disposed on a shaft 57 of the piston 46. The position of the piston 46, and thus the sealing rings 58, provides the various fluid flow paths through the modular chambers 48, 50, 52 and the control valve assembly 10 depending on which apertures 56 are open and which are closed by the various sealing rings 58. At least one sealing ring 58 is in association with the drain port assembly 16.

Lateral flow apertures 60 are constructed and arranged for defining paths for fluids to flow in and out of the chambers 48, 50, 52 in a direction that is orthogonal to the axis $A_1$ of the cavity 40, as well as a longitudinal axis $A_2$ of the piston 46. In the preferred embodiment, the axes $A_1$ and $A_2$ are co-linear, although variations are contemplated. One of these lateral flow apertures 60 is preferably associated with the inlet 18, and another of these lateral flow apertures 60 is preferably associated with the outlet 20. Additionally, some of these apertures 60 allow fluids to flow out of the chambers 48, 50, 52 and into channels integrally formed in the housing 12.

Referring now to FIGS. 11-14B, in some operational modes of the treatment system, particularly water softeners, it is often desired to blend the raw, or untreated, fluid entering the control valve assembly 10 with fluid, or treated fluid, leaving the control valve assembly 10. Accordingly, the control valve assembly 10 preferably includes a blending valve 62. The blending valve 62 is configured to provide for selective fluid communication between various chambers 48, 50, 52. Preferably, the blending valve 62 is integral with the housing 12, most preferably the top portion 34 of the housing 12.

As shown in FIGS. 11 and 12, the blending valve 62 includes a channel 64 in the top portion 34 of the housing 12 and a shaft or spindle 66 that extends through the channel 64. The channel 64 defines a longitudinal axis $A_3$ arranged parallel to the axis $A_1$ of the cavity 40. The shaft 66 extends through the channel 64 and is displaceable along the longitudinal axis $A_3$ of the channel 64. A threaded portion 68 on the shaft 66 is configured complimentarily to an inner surface 69 of a knurled wheel 70. A cover 72 extends over the knurled wheel 70 and is movably secured to apertures 74 in the top portion 34 of the housing 12 via posts 76. As will be appreciated, rotation of the knurled wheel 70 will displace the shaft 66 along the longitudinal axis $A_3$ of the channel 64. A removable stop 78 prevents the shaft 66 from unintentionally being withdrawn from the channel 64.

As shown in FIGS. 10, 13A, 13B, 14 and 14A, the channel 64 includes two apertures 80a, 80b in the top portion 34 of the housing 12 which are disposed to be associated with blending valve ports 82a, 82b in the chambers 48, 52, shown in FIG. 10. More specifically, when the present valve 10 is assembled, a first aperture 80a is associated with a blending valve port 82a on the first chamber 48, and a second aperture 80b, is associated with a blending valve port 82b on the third chamber 52.

In the depicted embodiment, the first chamber 48 is associated with the inlet 18 and the third chamber 52 is associated with the outlet 20. Depending on the position of the shaft 66 of the blending valve 62, a selective amount of fluid bypasses treatment and flows through the first blending valve port 82a, through the channel 64, into the third chamber 52, via the second blending valve port 82b, and out the control valve assembly 10 through the outlet 20.

Referring now to FIG. 8, in some operational modes, fluids are drained from the control valve assembly 10 via the drain port assembly 16. As shown, the drain port assembly 16 is includes a drain port 84 secured to a drain port module 86 via a clip 88, which has the same configuration as clips 24a, 24b, discussed above. The drain port module 86 includes a flange 90 which is configured to be received in an associated slot in the housing 12. Preferably, the drain port assembly 16 includes a flow restrictor 92 disposed in the drain port module 86.

Referring now to FIGS. 18-21, in various operational modes of the control valve assembly 10, fluids are directed either to or from a brine tank (not shown). Accordingly, the control valve assembly 10 preferably further comprises a brine valve assembly 94. The brine valve assembly 94 includes a brine valve 96.

An eductor 98 and the brine valve assembly 94 are at least partially disposed in an eductor cavity 100 integrally formed in the housing 12. A nozzle 102 and a distributor 104 are disposed on top of the eductor 98. A cap 106, covering the eductor 98, the nozzle 102, and the distributor 104, is secured to the housing 12. The cap 106 is preferably a separate component, but is optionally integrally formed with the top portion 34 of the housing 12.

The brine valve 96 includes a brine valve housing 110 with a port 112 and a brine piston 114 extending thorough the brine valve housing 110. A first end 116 of the brine piston 114 extends into the housing 12 of the control valve assembly 10. A second, opposite end 118 of the brine piston 114 extends out of the brine valve housing 110. A biasing element 120, such as a coiled spring, is provided to bias the brine piston 114. The brine piston 114, as will be described in more detail below, is displaceable in a direction along a longitudinal axis $A_4$, (FIG. 18) which is parallel with the axis $A_1$ of the cavity 40.

Figure 19:
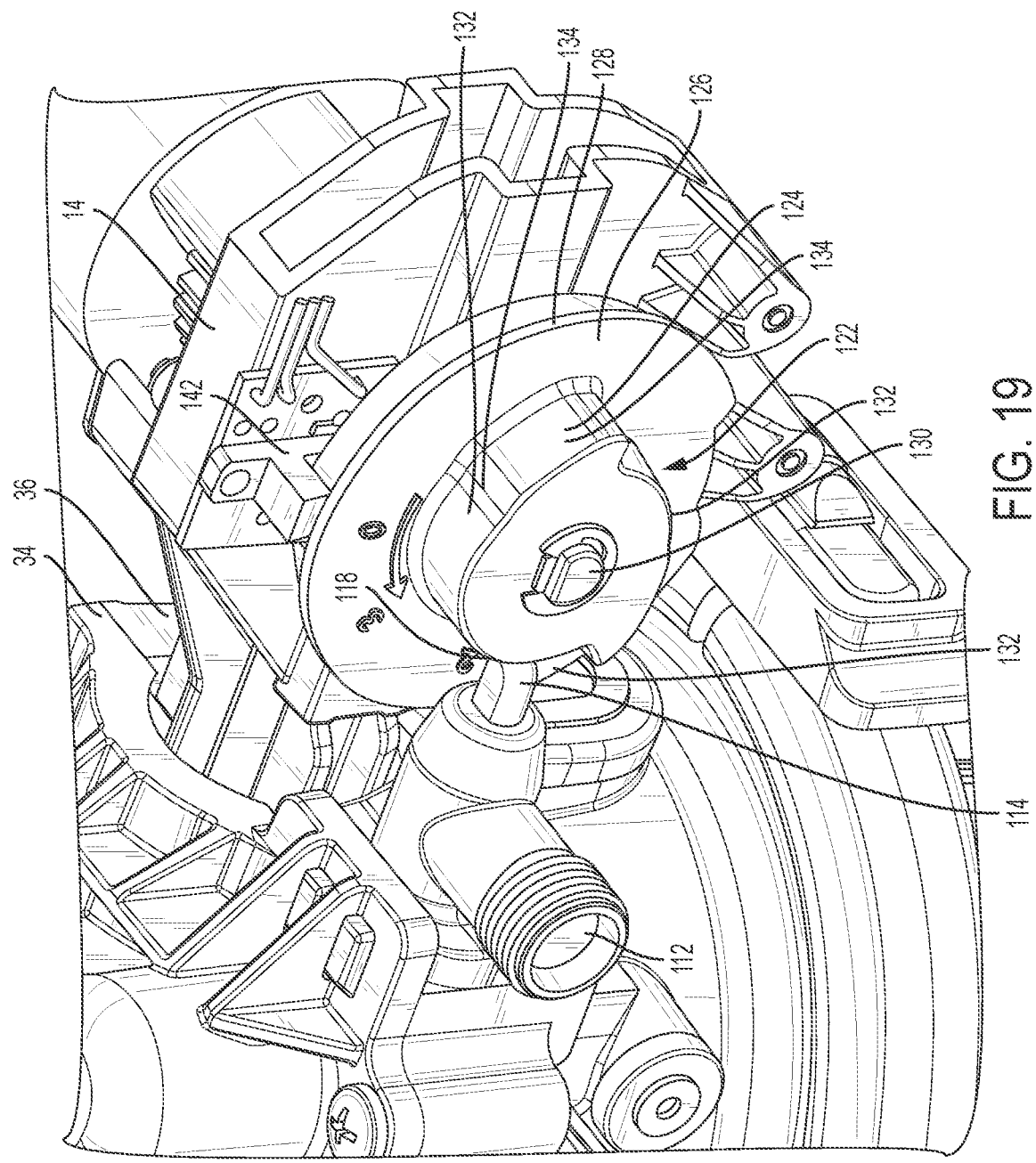
FIG. 19 is a back and top perspective fragmentary view of a drive cam in the present control valve assembly.
Figure 20:
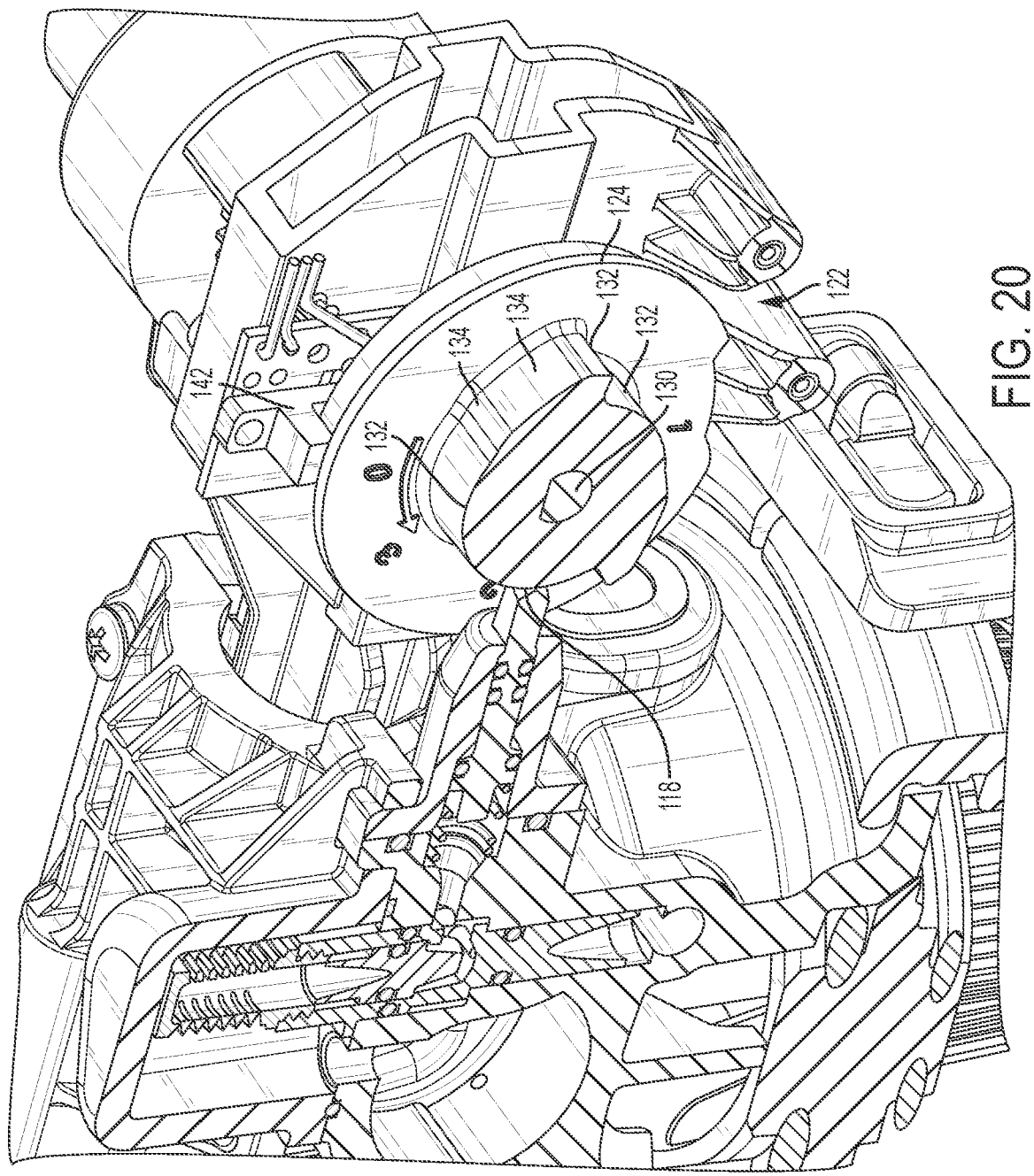
FIG. 20 is a partial cutaway view of FIG. 19.
Figure 21:
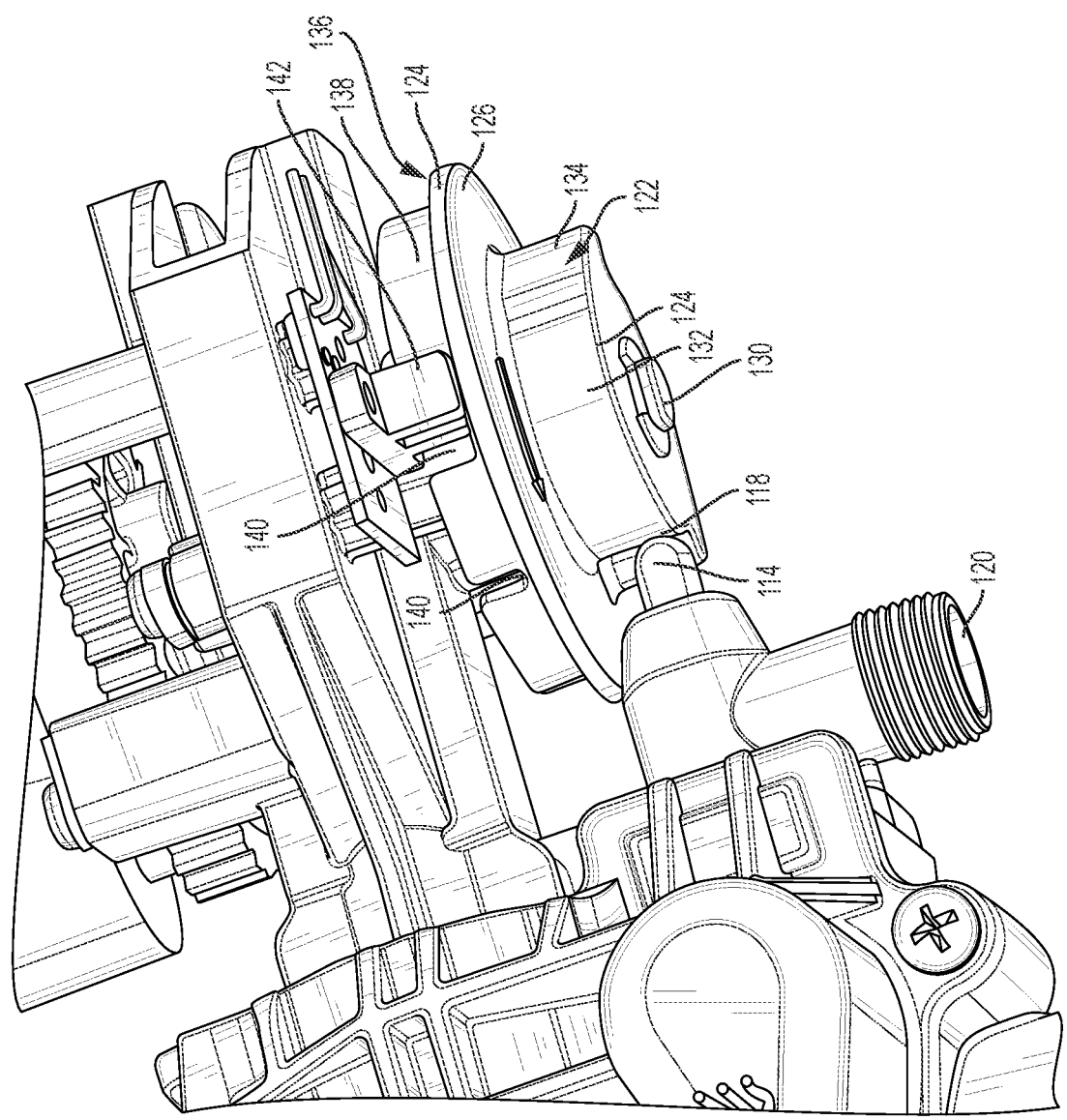
FIG. 21 is a top view of the drive cam shown in FIG. 17.

Turning to FIGS. 19-21, the positioning of the brine piston 114 is controlled by a brine cam 122 driven by a motor (not shown) of the motor assembly 14. The brine cam 122 is formed by a wall 124 extending outwardly away from a first surface 126 of a disk 128 of a main piston drive cam 129 disposed on an axle 130 that is driven by the motor (not shown). Thus, the brine cam 122 and the main piston drive cam 129 are preferably a single component. The wall 124 extends completely around the disk 128, i.e., 360 rotational degrees about the axle 130, and includes flat portions 132 that have a constant distance from the axle 130 (or point of rotation). The wall 124 also includes sloped portions or lobes 134 that are formed by increasing or decreasing a distance from the axle 130 (or point of rotation). As the disk 128 rotates, the second end 118 of the brine piston 114 will ride along the wall 124, and is biased towards the cam by the biasing element 120. The brine piston 114 will be moved reciprocally within the brine valve housing 110 depending on which of the various flat portions 132 and sloped portions 134 of the wall 124 are contacted by the brine piston 114.

Referring now to FIG. 21, also included on the main piston drive cam 129 is a second surface 136 of the disk 128 including a second wall 138 that has one or more gaps 140. The gaps 140 preferably have different circumferential or peripheral widths. More specifically, an electro-optical sensor 142 is disposed on the motor assembly 14 and is configured to generate an electrical signal based upon the presence of the second wall 138, the presence of a gap 140, or both. Since the second wall 138 is on the disk with the brine cam 122, the presence of the second wall 138 or the presence of the gap 140 will be among other things, representative of a rotational position of the disk 128 (or axle 130) as well as the rotational position of the brine cam 122. Preferably, the electrical signal generated by the electro-optical sensor 142 is communicated, via means known in the art, to a controller (not shown) which controls a motor (not shown) driving the piston 46 in the housing 12.

Figure 22:
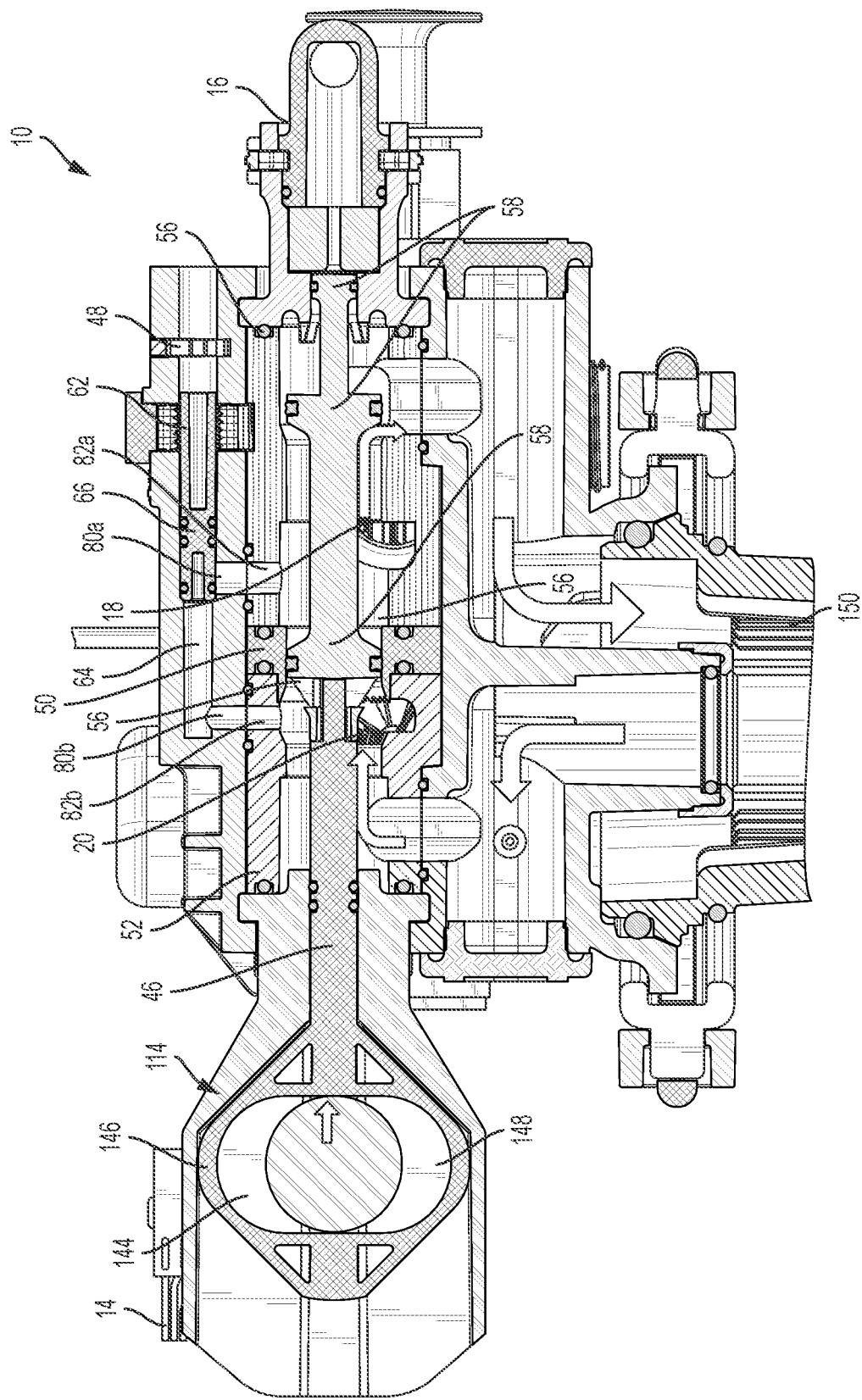
FIG. 22 is vertical cross-section of the present control valve assembly in a first operational mode.

Turning to FIG. 22, the piston 46 is driven by a motor (not shown) in the motor assembly 14 via a scotch yoke 144. The scotch yoke 144 includes a slotted portion 146 on one end of the piston 46. A drive member 148 that is rotated, via gears (not shown), by the motor is disposed within the slotted portion 146. As the motor rotates about an axis that is orthogonal to the axis $A_1$ of the cavity 40, the position of the drive member 148 will change. The movement of the drive member 148 will be translated to the piston 46 which moves in a direction along its longitudinal axis $A_2$. As mentioned above, sealing rings 58 disposed along the piston will interact with various apertures 56 of the chambers 48, 50, 52, as well as the drain port 84, to define different fluid flow paths through the control valve assembly 10.

Exemplary operation modes or cycles are shown in FIGS. 22-25A and will be briefly described. In FIG. 22, when the brine cam 122 is positioned for a service operational mode, the brine piston 114 is positioned to close the brine valve 96. As shown by the arrows in FIG. 18, raw or untreated fluid (lighter arrows) is received into the control valve assembly 10 via the inlet 18, and flows through the modular chambers 48, 50, 52 and out of the control valve assembly 10 through a tank distributor 150 into a tank for treatment (not shown). Treated fluid (darker arrows), isolated from the untreated fluid, is returned to the control valve assembly 10 via the tank distributor 150. The treated fluid flows out of the control valve assembly 10 though the outlet 20. Although not depicted as such, the blending valve 62 can be utilized to mix a desired amount of untreated or raw fluid with the treated fluid.

Figure 23:
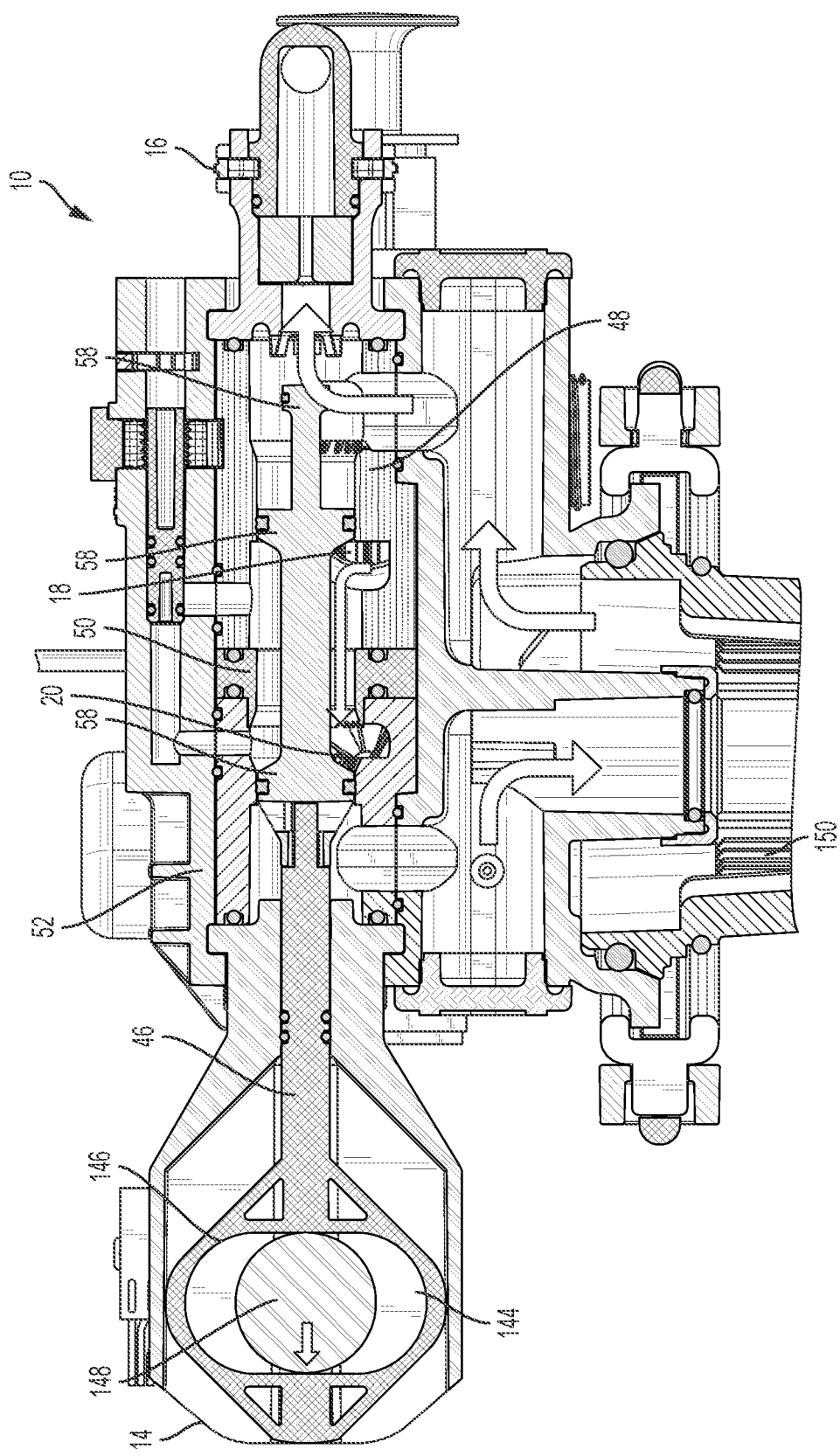
FIG. 23 is a vertical cross-section of the present control valve assembly in a second operational mode.
Figure 23A:
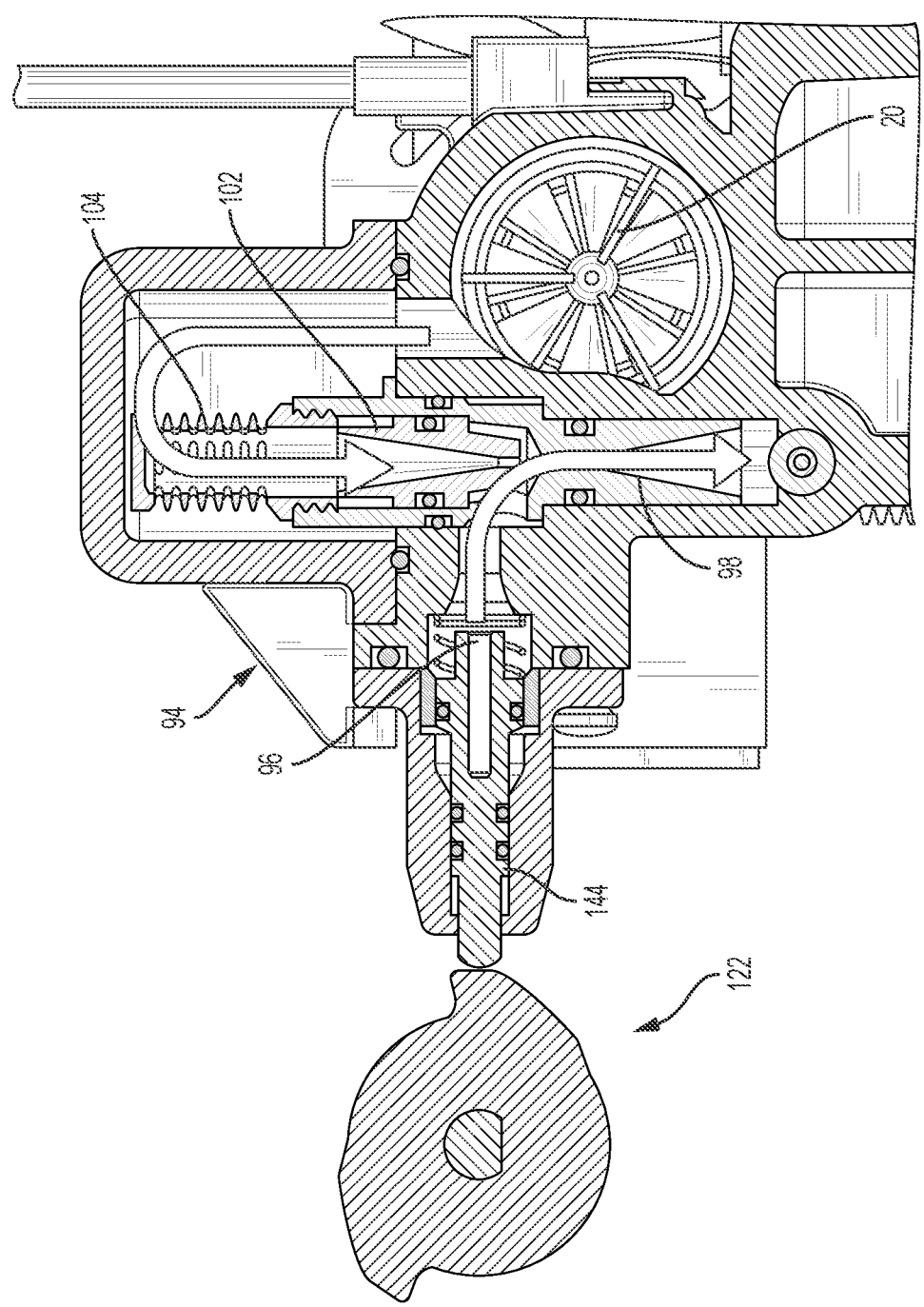
FIG. 23A is another fragmentary cross-section the present control valve assembly in the second operational mode.

Turning now to FIGS. 23 and 23A, when the brine cam 122 is positioned for a brining or a slow rinse operational modes, the brine piston 114 is displaced by the brine cam 122 to open the brine valve 96, allowing for brine fluid to be drawn from a separate brine tank (not shown) into the control valve assembly 10. Based upon the position of the brine cam 122, and, the electro-optical sensor 142 (FIGS. 19 to 21) operating in conjunction with the main piston drive cam 129, an appropriate signal is sent to the motor, depending on the presence of the second wall 138 or a gap 140, to position the piston 46 to provide the desired fluid flow path through the control valve assembly 10.

As shown by the arrows in FIGS. 23 and 23A, brine from the remote brine tank is received into the valve control assembly 10 via the inlet 18 and flows from the first chamber 48, through the second chamber 50, and to the third chamber 52. The spent treated fluid from the treatment tank (not shown) flows out of the control valve assembly 10 through the drain port assembly 16. In FIG. 23A, the specific path of the brine into the control valve assembly 10 is shown. Specifically, in the brine valve assembly 94, the brine flows through the nozzle 102 and eductor 98. As the untreated fluid flows through the eductor 98, as is known, the passing fluid will draw brine fluid from a brine tank (not shown) via the port 112 (see, FIG. 19) of the brine valve 96. The mixture of the brine fluid and untreated fluid flows through the tank distributor 150 into the treatment tank.

The treated fluid (meaning fluid different from the untreated/brine mixture) remaining in the treatment tank from the prior service mode returns to the control valve assembly 10 from the treatment tank through the tank distributor 150 and flows out of the control valve assembly 10 through the drain port assembly 16.

Figure 24:
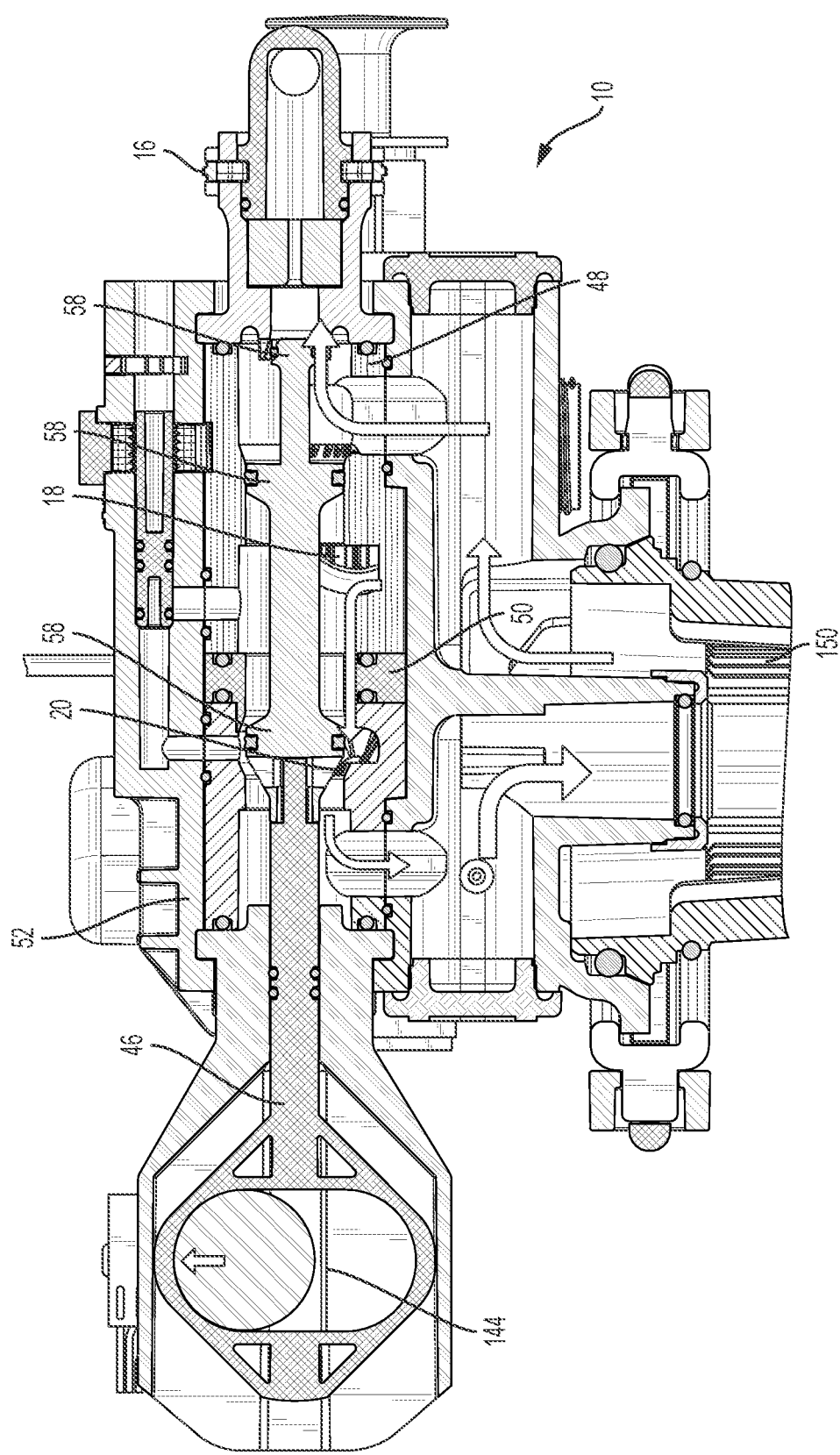
FIG. 24 is vertical cross-section of the present control valve assembly in a third operational mode.

Turning now to FIG. 24, when the brine cam 122 is positioned for a fast rinse operational mode, the brine piston 114 is positioned to close the brine valve 96. Based again upon the position of the brine cam 122, and, the electro-optical sensor 142 (FIGS. 19 to 21) on the main piston drive cam 129 has sent another signal to the motor, depending on the presence of the second wall 138 or a gap 140, to position the piston 46 to provide the desired fluid flow path through the control valve assembly 10.

As represented by the arrows in FIG. 24, the fluid flow path through the control valve assembly 10 in the fast rinse operational mode is similar to the brining or a slow rinse operational modes described above. Specifically, raw or untreated fluid is received by the control valve assembly 10 via the inlet 18. The raw or untreated fluid flows from the first chamber 48, through the second chamber 50, and to the third chamber 52. A portion of the untreated or raw fluid flows out of the control valve assembly 10 through the drain port assembly 16 to flush the brine from the treatment tank.

In the fast rinse operational mode, a second portion of the untreated or raw fluid flows directly through the tank distributor 150 into the treatment tank. The treated fluid (meaning fluid different from the untreated fluid) returns to the control valve assembly through the tank distributor 150 and flows out of the control valve assembly 10 through the drain port assembly 16.

Figure 25:
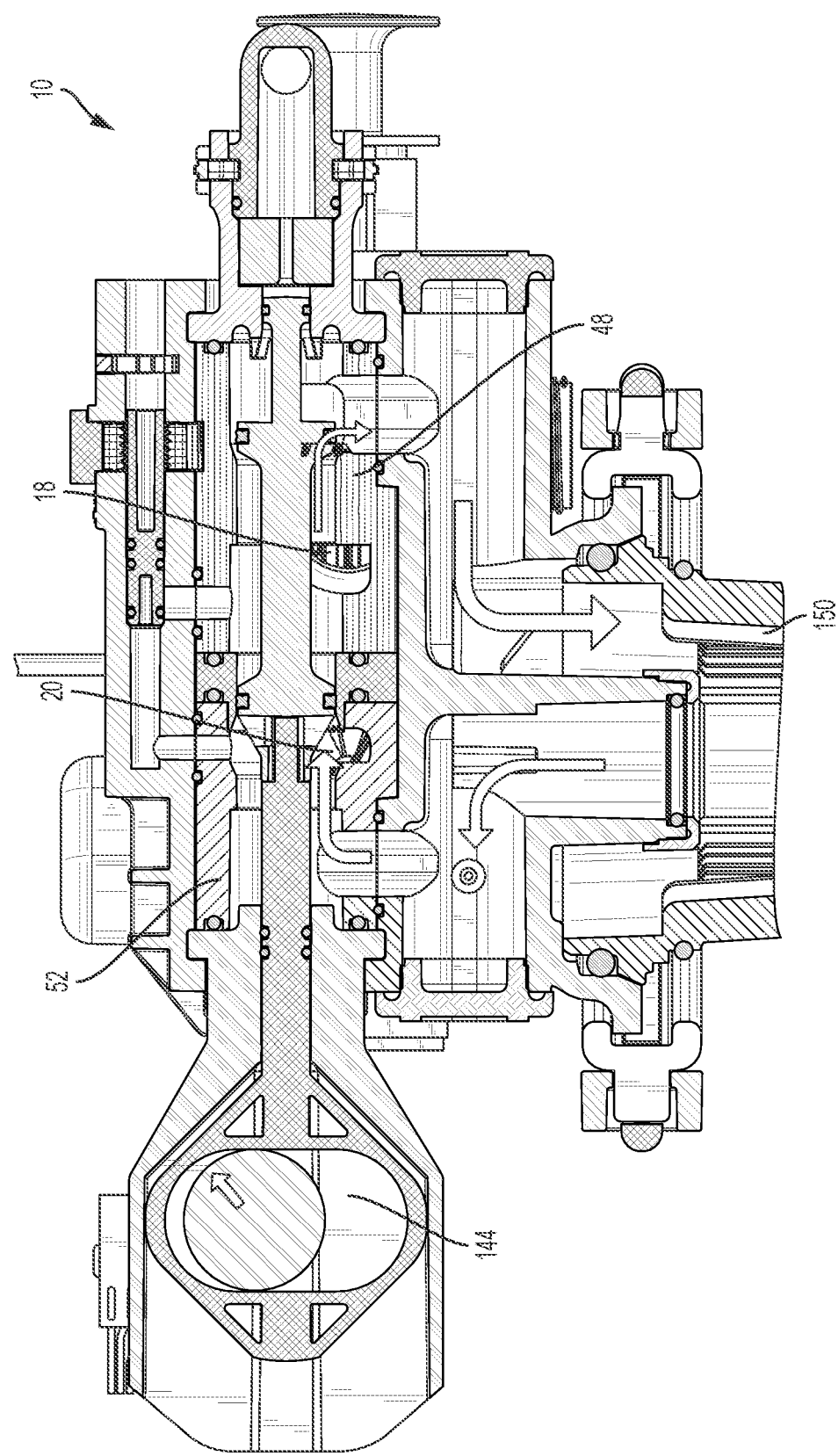
FIG. 25 is a vertical cross-section of the present control valve assembly in a fourth operational mode.
Figure 25A:
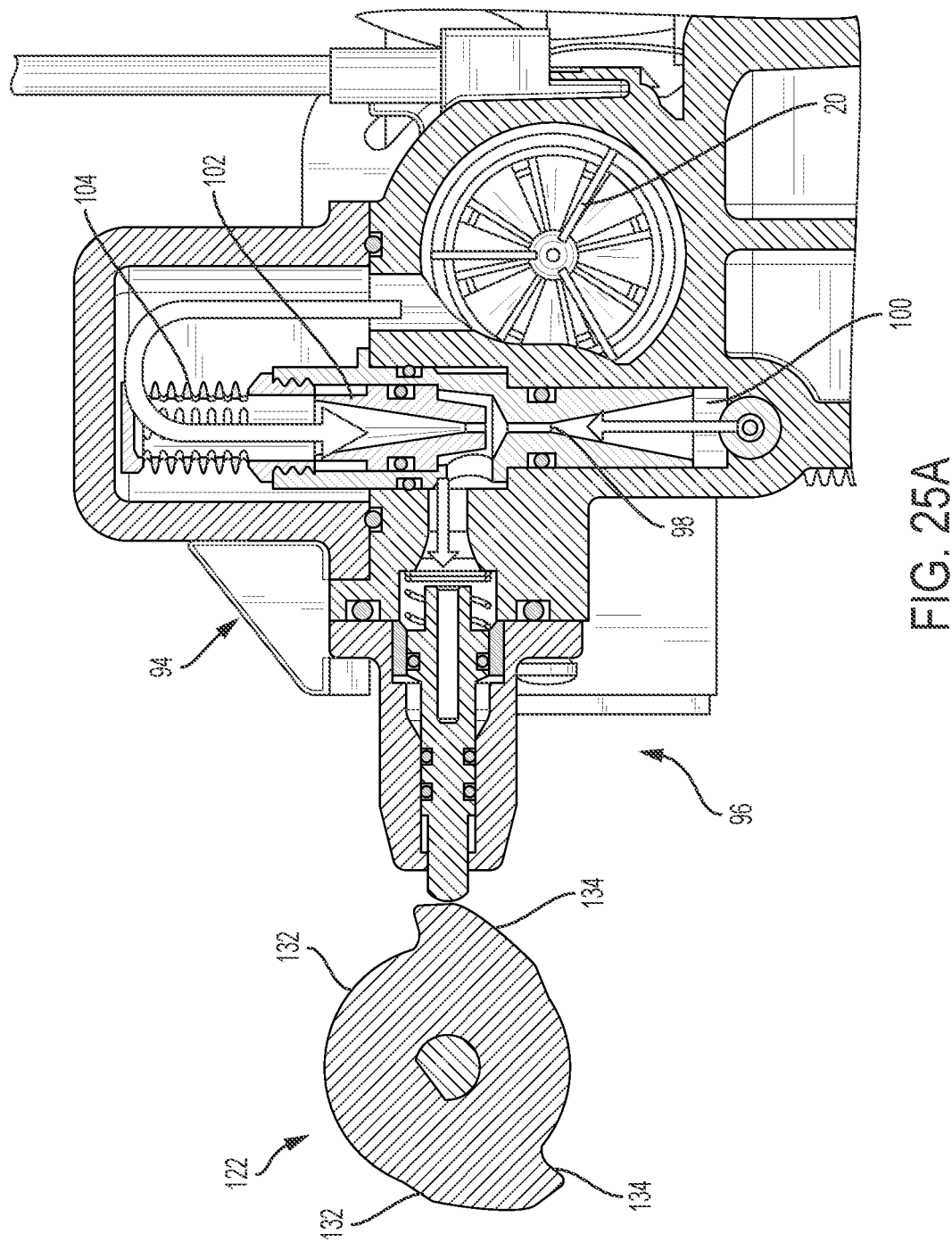
FIG. 25A shows another fragmentary cross-section of the present control valve assembly in the fourth operational mode.

Turning to FIGS. 25 and 25A, when the brine cam 122 is positioned for a fill operational mode, the brine piston 114 is displaced by the brine cam 122 to open the brine valve 96, allowing for fluid to flow out of the control valve assembly 10 and into the brine tank via the port 112 (see, FIG. 19). Based upon the position of the brine cam 122, and the main piston drive cam 129, the electro-optical sensor 142 (FIGS. 19-21) has sent another signal to the motor, depending on the presence of the second wall 138 or a gap 140 on the main piston drive cam, to position the piston 46 to provide the desired fluid flow path through the control valve assembly 10.

As shown by the arrows in FIGS. 25 and 25A, raw or untreated fluid is received into the control valve assembly 10 via the inlet 18, and flows out of the control valve assembly 10 through the tank distributor 150 to the tank for treatment. Treated fluid (meaning that it is different than the untreated fluid), isolated from the untreated fluid, is returned to the control valve assembly 10 via the tank distributor 150. From the third chamber 52, a first portion of the treated fluid flows out of the control valve assembly 10 through the outlet 20. A second portion of the treated fluid flows to the brine valve assembly 94.

As seen in FIG. 25A, the fluid flows downward both through the distributor 104, nozzle 102, and eductor 98 and upward (based upon the orientation of the drawing) through the eductor 98. The fluid flows out of the brine valve assembly 94 and the control valve assembly 10 via the port 112 (FIG. 19), and to the brine tank to fill same.

Upon rotation of the brine cam 122, the brine piston 114 will close the brine valve 96 and the piston 46 will be displaced based upon a signal generated by the electro-optical sensor 142 and the control valve may return to, for example, the service operational mode.

It should be appreciated and understood by those of ordinary skill in the art that various other components such as various clips, fasteners, couplings, interfaces, sealing elements, O-rings, and other elements, some of which are shown in drawings, were not specifically discussed as it is believed that the specifics of same are well within the knowledge of those of ordinary skill in the art and a description of same is not necessary for practicing or understanding the embodiments of the present invention.

While at least one exemplary embodiment has been presented in the foregoing detailed description for a control valve assembly, it should be appreciated that a vast number of variations exist. It should also be appreciated that the exemplary embodiment or exemplary embodiments are only examples, and are not intended to limit the scope, applicability, or configuration of the control valve assembly in any way. Rather, the foregoing detailed description will provide those skilled in the art with a convenient road map for implementing an exemplary embodiment of the control valve assembly, it being understood that various changes may be made in the function and arrangement of elements described in an exemplary embodiment without departing from the scope of the control valve assembly as set forth in the appended claims and their legal equivalents.

The invention claimed is:

1. A control valve assembly for a fluid treatment system comprising:
   a housing having a top portion and a bottom portion removably secured to the top portion, the housing including an inlet and an outlet;
   at least two chambers secured in the housing, a first chamber configured to receive fluid from the inlet and a second chamber configured to provide fluid to the outlet;
   a piston comprising a shaft with a plurality of sealing rings, the piston extending through the housing and through the first chamber and the second chamber and being configured to move in a direction along its longitudinal axis to control a flow of fluid in the control valve assembly; and,
   a blending valve comprising a channel, the blending valve and the channel integrally formed in the top portion of the housing, and the channel configured to allow a portion of the fluid in the first chamber to flow from the first chamber into the channel and out of the channel into the second chamber in order to mix the portion with fluid in the second chamber.

2. The control valve assembly of claim 1, wherein the blending valve further comprises a shaft extending through the channel.

3. The control valve assembly of claim 2 wherein the shaft has a longitudinal axis and the shaft is displaceable in a direction along the longitudinal axis.

4. The control valve assembly of claim 3 wherein the shaft includes a threaded portion, and wherein the blending valve further comprises a knurled wheel having an inner surface configured complimentarily to the threaded portion of the shaft.

5. The control valve assembly of claim 1 further comprising:
   a brine valve assembly comprising an eductor disposed in an eductor cavity integrally formed in the housing.

6. The control valve assembly of claim 5 wherein the brine valve assembly further comprises a brine piston configured to be moved by a drive cam.

* * * * *